US008052534B2

(12) United States Patent
Crouch et al.

(10) Patent No.: US 8,052,534 B2
(45) Date of Patent: Nov. 8, 2011

(54) INTERACTIVE, THEMATICALLY-RELATED ENTERTAINMENT SYSTEM INCLUDING UNIVERSALLY-INTERCHANGEABLE, ATTACHABLE, DESIGN-BEARING ORNAMENTS

(75) Inventors: Marissa Beth Crouch, Portland, OR (US); Anne Frances Mersereau, Portland, OR (US); James Stewart, Portland, OR (US); Patrick D. Boyd, Portland, OR (US)

(73) Assignee: Pak Nak, LLC, Portland, OR (US)

( * ) Notice: Subject to any disclaimer, the term of this patent is extended or adjusted under 35 U.S.C. 154(b) by 882 days.

(21) Appl. No.: 12/082,372

(22) Filed: Apr. 9, 2008

(65) Prior Publication Data

US 2009/0036219 A1 Feb. 5, 2009

Related U.S. Application Data

(60) Provisional application No. 60/922,370, filed on Aug. 1, 2007.

(51) Int. Cl.
*A63F 13/00* (2006.01)

(52) U.S. Cl. ................................. 463/47; 463/9; 463/43

(58) Field of Classification Search .................... 463/40, 463/9, 43, 44, 46, 47
See application file for complete search history.

(56) References Cited

U.S. PATENT DOCUMENTS

| | | | | |
|---|---|---|---|---|
| 2,975,538 | A * | 3/1961 | Murfin | 40/638 |
| 4,220,016 | A * | 9/1980 | Frenger | 63/14.9 |
| 4,354,282 | A | 10/1982 | Langdon | |
| 4,519,781 | A | 5/1985 | Boyd | |
| 4,710,979 | A | 12/1987 | Bull | |
| 4,853,994 | A | 8/1989 | Ekstein | |
| 5,136,726 | A | 8/1992 | Kellin | |
| 5,224,895 | A * | 7/1993 | Franz | 446/321 |
| 5,394,565 | A | 3/1995 | Stewart | |
| 5,523,129 | A | 6/1996 | McGeehan-Hatch | |
| 5,540,609 | A | 7/1996 | Hoag | |
| 5,579,692 | A * | 12/1996 | Collier | 101/405 |
| 5,734,991 | A | 4/1998 | Schmid | |
| 5,845,334 | A | 12/1998 | Marcolini | |
| 5,884,770 | A * | 3/1999 | Galm | 206/575 |
| 6,010,387 | A | 1/2000 | Nemec | |
| 6,224,107 | B1 | 5/2001 | Smith | |
| 6,296,913 | B1 * | 10/2001 | D'Andrade | 428/40.1 |
| 6,553,786 | B1 * | 4/2003 | Kwiat | 63/26 |
| 6,832,955 | B2 * | 12/2004 | Yokoi | 463/7 |
| 6,982,115 | B2 | 1/2006 | Poulos | |
| 2007/0075485 | A1 * | 4/2007 | Derman et al. | 273/119 R |

FOREIGN PATENT DOCUMENTS

| | | |
|---|---|---|
| CA | 2261498 | 4/2000 |
| DE | 202006006227 U | 9/2006 |
| WO | WO/8600540 | 1/1986 |
| WO | WO/0139156 | 5/2001 |

* cited by examiner

*Primary Examiner* — James McClellan
(74) *Attorney, Agent, or Firm* — Ater Wynne LLP

(57) ABSTRACT

An interactive entertainment system including numerous thematically-related elements, and particularly including one or more pliant, design-bearing ornaments which are transferable and/or attachable nearly anywhere. Each ornament includes and defines a character embodied in a design fixed thereupon, and such characters provide a thematic-basis and continuity throughout the numerous features and elements of the invented entertainment system. The ornaments are typically universally-interchangeable within the system embodiments, being operably attachable and detachable via reciprocal hook and loop fastener, for example, with any of a great variety of structures, each structure configured for coupling an ornament with one or more of a great variety of substrates. Other thematically-related elements include but are not limited to an interactive game, a combination greeting card/gift box/display unit, alternative means for affixing and/or transferring ornament-embodied designs to substrates, ornamental 'trading' cards, a collection/display means configured, for example, as an album, and others.

18 Claims, 5 Drawing Sheets

INTERACTIVE, THEMATICALLY-RELATED ENTERTAINMENT SYSTEM INCLUDING UNIVERSALLY-INTERCHANGEABLE, ATTACHABLE, DESIGN-BEARING ORNAMENTS

RELATED APPLICATIONS

This application claims the benefit of priority to U.S. Provisional application No. 60/922,370, originally filed on Aug. 1, 2007 and entitled METHOD FOR AND CREATION OF INTERCHANGEABLE POLYVINYL CHLORIDE (PVC) DECORATIVE ACCESSORIES FOR CARRYING BAGS, the contents of which are hereby incorporated herein in their entirety by this reference.

BACKGROUND OF THE INVENTION

The invention relates generally to the field of functional entertainment systems for youth. More particularly, the invention relates to a fun, interactive system of elements including and thematically-related to interchangeable, attachable design-bearing ornaments.

Children generally love to decorate things, and they frequently prefer ordinary articles (e.g., clothing, backpacks, hats, their hair, etc.) which include or can be altered to include interesting, colorful, fun designs.

Many products exist that allow children to decorate articles. For example, paints, dyes, and even sparkly gels can be applied to fabrics and other surfaces. However, some of these products, once applied, become permanent, and cannot be removed without damaging the article. Therefore, the applied design becomes relatively inalterable. Conversely, for those products that can be removed once applied (e.g., washed or otherwise treated to remove the product), removal permanently destroys the design.

Alternatively, designs in the form of patches can be sewn onto fabric articles, such as clothing, hats, backpacks, etc. While sewn patches can be later removed, removal may be difficult, can damage the product, and repeated application is very time consuming.

Decorative pins (and rivet-type devices) can be fastened to articles, but repeated attachment and removal of sharp pins from an article each time a child wishes to change his or her design choice presents an increased danger from accidental pin sticks of a child's fingers. Additionally, repeated perforation of the fabric can cause premature wear in a fabric. Further, each pin is nothing more than what it is. A pin featuring, for example, the HELLO KITTY™ character design is and always remains just a pin, and likewise continues to embody just the HELLO KITTY™ character. Thus, such items are static, and their popularity and use is subject to a child's waxing and waning enthusiasm for that design.

Some prior art concepts confine their applicability to items of apparel and/or require such times to be specially manufactured and/or irreversibly altered to include specialized structural features (smooth PVC substrate, sewn-on hook-and-loop fasteners, etc.), to enable attachment of detachable design elements. Examples include U.S. Pat. Nos. 6,982,115, 5,845,334 and 5,136,726, among others. Some such concepts include a graphic design formed at the surface of the apparel item and/or corresponding designs at one or more of the attachable elements. However, as stated, the design and any theme (i.e., a game or scene) embodied therein does not extend beyond the apparel item and the attachable elements. Examples include U.S. Pat. Nos. 5,734,991 and 6,982,115.

Other concepts include each of a self-contained story board and/or story quilt, with attachable design elements and a theme (i.e., doll house) embodied thereupon (U.S. Pat. Nos. 5,540,609 and 5,733,166). These patent documents also describe a wristband with a hook-and-loop fastener element provided thereupon for attaching a doll (i.e., human- or animal-shaped) thereto.

Various children's books and/or wall-mounted structures are known which include pockets and/or hook-and-loop fastener portions configured to receive design-bearing items, such as stuffed, cloth dolls. Although such books, etc. typically have a design theme provided therein, neither the theme and thematic features, nor the attachability, extend beyond the scope of the book or other structure and the included dolls or other design-bearing items. See for example, U.S. Pat. Nos. 4,853,994, 5,523,129.

Another shortcoming in kids' play articles is the absence of a rich, interactive story underlying easily and universally transferable design-bearing items, and extending throughout a plurality of other interactive play structures, locations, and contextual variations. Certainly there's no on-going story behind a tube of paint or glitter-gel. The purpose of such passive products is simply to decorate an article according to a child's whim, and any interconnection or relationship with other designs or activities is quite limited. The fact that the prior art is devoid of such systems indicates either or both of non-recognition of such a system, or the presence of a long-felt but unmet need.

DETAILED DESCRIPTION OF THE PREFERRED EMBODIMENTS

Figure 1A:
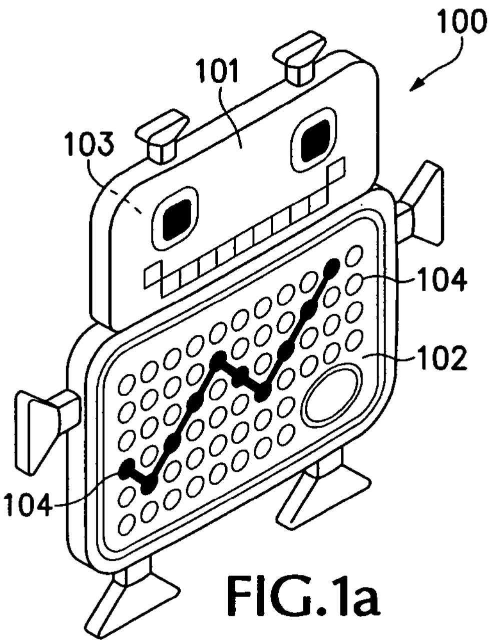
FIGS. 1*a-b* depict in perspective view a first design-bearing side of an ornament, and an opposing second side of an ornament, according to embodiments of the invention.

As will be apparent from the description and figure provided herein, the invented interactive, thematically-related entertainment system including universally-interchangeable, attachable, design-bearing ornaments provides a novel device for constructing and interacting with a community of design-embodied characters. For the first time, rather than a character design-bearing ornament (hereinafter, ornament) being inseparably bound to an affixation structure (e.g., a pin, a magnet, an item of jewelry, etc.), each and every character ornament is universally-interchangeable with each and every type of affixation structure. Such interchangeability enables a user to change appearance and arrangement of their selected suite of wearable fashion accessories, room, decorations, functional item adornments (e.g., key ring ornaments, zipper-pulls, buttons, etc.) quickly, easily, and at the beck and call of their changing decorative whims.

Additionally, a 'character' embodied in each design-bearing ornament (hereinafter, ornament) is thematically-related with one or more other 'characters' embodied in other ornaments in the invented system, providing a thematic community of character-designs. Each character therein possesses an assigned character 'profile' including a predetermined set of fictional facts. One or more facts of each character matches and/or corresponds with one or more facts of one or more other characters, providing a web of multi-dimensional relationships between and among the characters. Additionally, users of the invented system, typically children, will identify and develop additional interrelationships as they interpret the characters and relationships through their own creative thinking and play styles.

Through the use of a broad range of affixation structures, each configured as described for universal interchangeability with the ornaments, a user can stably and durably, yet detachably, affix an ornament to nearly any article or surface the user so wishes, typically without destroying or degrading the article or surface upon removal of either the ornament or the affixation structure. Additionally, broken or damages affixation structures can be discarded and/or replaced without also requiring associated ornaments to be discarded or replaced, and vise versa, reducing waste and preserving a user's intact character community, and/or range of ornament placement options, in case of damage or a material failure to a component of the invented system. That is, damage to either of an ornament or an affixation structure does not necessitate the loss of both.

Additionally, the invented system includes numerous other character-community-centered elements, thematically related to the characters embodied in the ornaments and/or one or more dimension of the multi-dimensional relationships established therebetween. For example, image transfer means are included in an embodiment of the system, by which a user can transfer an image of a character to surfaces that may be impractical, undesirable (in the user's subjective opinion, not for practical or objective reasons) or incompatible with one or more of the affixation structures possessed by a user. For example, a user may not wish to affix an affixation structure and an ornament to a piece of paper (e.g., a note to a friend), but may wish to transfer to the paper an image corresponding to the design of an ornament-embodied character. According to an embodiment, an image transfer means such as an stamp mechanism is provided with an image corresponding to an ornament character, enabling a user to transfer the image to the paper in the form of an ink pattern formed thereupon. Likewise, an image transfer means can include a peel-and-stick sticker bearing a pressure-sensitive adhesive, for example, on one side, and an image corresponding to an ornament-embodied character on the other side. For simplicity of description hereinafter, an ornament-embodied character is simply referred to as a character, unless otherwise indicated.

The generalized introduction above provides just an initial flavor of the contemplated embodiments of the invented system. Numerous other embodiments and novel elements of the invented system are contemplated and described herein, and therefore the generalized description above should not be interpreted as limiting the scope of the contemplated embodiments.

Figure 1B:
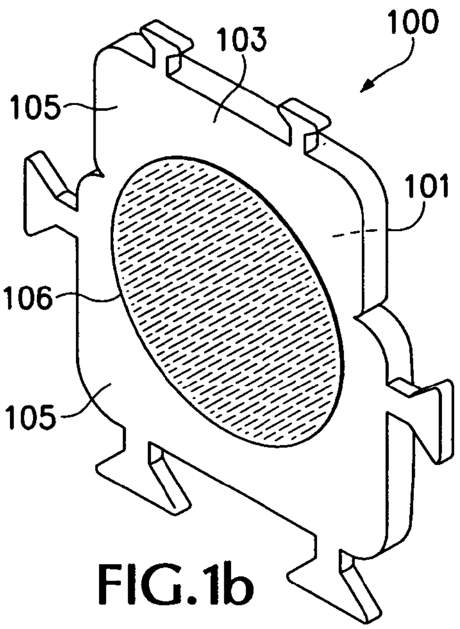

Turning now to the figures, FIGS. 1*a*-1*b* depict an ornament 100 having a first design-bearing side 101 and an opposing second side 103. The surface 102 of the first side 101, or 'first surface', is typically textured. For example, the texturing may comprise, alternatively or in combination, features provided in relief one relative to another, surface roughness, elevations in one portion of the surface relative to another portion, etc. However, the presence of texturing does not imply that the first surface cannot feel smooth to human touch while also being 'textured'. For example, a first surface 102 can be a substantially smooth material (e.g., visibly and/or tactilely smooth), but be considered textured by having either or both of elevated and recessed portions of the first surface 102 when viewed in cross-section. Applied generally to embodiments contemplated herein, 'textured' simply means that an ornament has a first material thickness measured between the first surface 102 and an opposing second surface 105 of the second side 103 at any one portion of the ornament 100, and a second thickness likewise measured at another portion of the ornament 100.

An ornament 100 is typically formed of a pliant material. Preferably, ornaments in embodiments are supple, flexible, bendable, twistable, and otherwise deformable, but are also sufficiently resilient to substantially return to an originally formed shape and flatness upon the removal of a deformation-inducing force. The degree of pliancy may be quite variable between embodiments, and it should be understood as well that the scope of contemplated embodiments likewise encompasses relatively non-pliant, and even rigid materials. One having ordinary skill in the art will recognize that pliant materials provide advantages such as a reduced likelihood of breaking under applied force, as well as a reduced likelihood of injuries (e.g., breaking the skin) to users and others.

A non-exclusive list of other desirable properties in one or more embodiments includes colorfastness, water-resistance (e.g., non-wetting, non-water-absorbing, non-water-soluble), oil-resistance, tear-resistance, resistance to substantial temperature extremes and variations, ease of manufacture, durability, reflectivity, low cost, non-toxicity, ability to form a strong and durable bond with a suitable adhesive material, and other characteristics useful in articles designed for extended and safe use by children. With particular references to non-toxicity, a preferred but non-exclusive embodiment includes a material which is shown to not release phthalates during handling. Phthalates, present in a large number of synthetic materials (e.g., polymers, etc.), are a family of substances known or suspected to influence liver damage, hormonal activity, birth defects, cancer, allergies in children, Type II diabetes, and other conditions. Silicone, for example, is a non-phthalate releasing material which possesses several of the listed beneficial properties, although adhesively bonding other material to silicone can present challenges.

Other characteristics may be desired, useful, or beneficial in one or more embodiments, while one or more of the above listed characteristics may likewise be beneficially omitted in another embodiment. For example, in a contemplated embodiment, an ornament or some part thereof may exhibit a characteristic and detectable response to one or more environmental conditions (e.g., thermal, etc.) substances (e.g., toxins, etc.), and/or energies (e.g., ultraviolet or other forms of harmful radiation, etc.). Therefore, an ornament affixed, for example, to a child's clothing can serve as a warning indicator when a child is exposed to conditions in the environment which may present a danger to the health of the child and/or others. Such conditions can trigger a response in a material when conditions either surpass or subside below a threshold response level of exposure, or when the amount or intensity of exposure enters into or departs from a response-activating range.

Thus, not every suitable material will possess each of the above listed characteristics, or to the same degree as a preferred embodiment, and so the scope of embodiments is not limited only to materials possessing all the listed characteristics. Nor is the scope limited only to materials having any particular characteristic at, above, or below a particular measurable threshold. Rather, the embodiments of suitable materials are far more expansive that any contemplated 'preferred' embodiment listed herein or understandable to one having ordinary skill in the art based on the descriptions provided herein.

Examples of suitable materials include various formulations of rubber, plastic, or any of a wide variety of synthetic materials, including but not limited to polymers. In an exemplary embodiment, a suitable and preferred material includes polyvinyl chloride (PVC). Materials can be combined in an ornament, either homogenously or heterogeneously, for example to supplement one or more material characteristic deficiencies in a material with one or more material characteristic assets in another material. Additionally, materials may be used without adding artificial color-imbuing substances (e.g., dyes, etc.), but may also have artificial color-imbuing substances added to imbue the material with an intended color or hue. The embodiments, including a preferred embodiment, contemplate both situations, as well as situations including combinations thereof.

In yet another embodiment, an ornament can be formed of materials which are reclaimed, recycled, reconstituted, renewed, recombined, or otherwise derived from previously used materials, for example, providing a 'green' option which is beneficial to the environment. Likewise, the material from which an ornament is formed can itself be reclaimed, recycled, reconstituted, renewed, recombined, etc. when its useful lifespan as an ornament is terminated. Therefore, embodiments should be considered to include such natural, renewable materials as wood, bamboo, and others. Likewise, composite materials including both natural materials and 'synthetic' materials, or different types of nature materials combined into a composite material, can be used in alternative embodiments.

A first side 101 of each ornament 100 bears a pattern constituting a visual design 104. In a typically but not exclusive embodiment, a design 104 comprises purposefully arranged combinations of two or more colors, with each color presented in one or more relatively discrete shapes, the collective arrangement of which constitute either a novel and/or a recognizable design (e.g., a robot, a flower, an animal, etc.). As contemplated herein, white and black are considered colors, as well as any gradation therebetween. Likewise, any shade, color, hue, or other detectible portion of the visible electromagnetic spectrum reflected or otherwise emitted from the visible portion of the electromagnetic spectrum, or from any other part of the spectrum which presents a visually detectable result (e.g., a 'brightening' effect provided by some ultraviolet wavelengths, etc.) is considered a 'color' according to embodiments. Therefore, portions of an embodiment and/or design which include reflective materials or structures, glow-in-the-dark materials, phosphorescent materials, ultraviolet emitting and/or reflecting materials, or others as would be understood by one having skill in the art (including the material and/or optical arts), are likewise contemplated within the embodiments.

Colors can be provided by dyes, as mentioned, or by applying paint or stain, by utilizing material naturally having a desired color, or by nearly any other known substance, means, or method for imbuing a material with a human-perceivable color. Of course, in alternative embodiments, an ornament according to the described embodiments may possess a design defined entirely without color variation, but rather by being formed into the material by molding, carving, impressing, branding, or otherwise fixing a human-perceivable design at a surface of the material of an ornament.

As mentioned, either alternatively or simultaneously, a design 104 according to an embodiment can also include textural features, such as one or more portions elevated above a nominal surface plane of one or more other portions, providing three-dimensional design aspects. Likewise, a design 104 can include one or more portions recessed (e.g., depressed, sunken, etched, etc.) below a nominal plane of one or more other portions. Of course, an embodiment of an ornament 100 can include a design 104 incorporating both elevated and recessed portions relative to a nominal surface plane, providing a notably textured design. Further, an embodiment of an ornament also considered 'textured' herein can have a relatively planar nominal surface plane across most of the ornament, deviating only proximate the periphery, with a departure from the nominal surface plane constituting a rounded-over edge, a bevel, a gradual thinning, or some other such arrangement and/or structural feature.

Textured elements in a design-bearing ornament provide both a visual and tactile richness to the design, increasing the sensory appeal of such design embodiments to users. Additionally, such three-dimensional, textural elements will, in embodiments, enhance the perceptibility and/or recognition of one or more distinctive characteristics of a character embodied in a particular design 104 embodiment. According to a typical, although not exclusive, embodiment, a design 104 is includes a plurality of colors, wherein one or more portions of the design 104 having a first color are separated by an integrally-formed textural feature from one or more portions of the design having a second color. For example, a design 104 may include a feature having a first color (design portion) which is elevated (e.g., thickened, raised, projecting, etc.) relative to a surrounding feature having a second color (design portion). Conversely, a design feature of a first color can likewise be separated from a design feature of a second color by a recess (e.g., a groove, trench, or other thinned portion) formed into the first surface 102.

In some embodiments, a design 104 is original and creative, and constitutes copyrightable expression, while in other embodiments, a design 104 can represent a more ordinary, non-original image (e.g., the earth, the American flag, a soccerball, etc.). All original and non-original designs are contemplated within the scope of the invention.

In particular, two or more different designs 104 embodied in two or more different ornaments 100 can be thematically related to one another. Such relationship can be established based upon an inherent visual resemblance or a thematic continuity between the designs (e.g., two or more designs representing flowers, etc.). In such embodiments, a thematic relationship between two or more designs 104 may be visually apparent to a user. Of course, the designs of two or more ornaments may also be visually dissimilar, yet the designs can obtain thematic relativity through commonality of subject matter (e.g., sports, etc.), color, textual elements (e.g., team names), or some other visual design element. As will be discussed further below, a notable embodiment provides one or more thematic relationships between different ornament design embodiments by establishing fictional identities and facts related to each design, providing to each design a character identity, and providing both express, inherent, and derivable interrelationships between each character/design embodiment, and one or more other character/design embodiments of the invented system.

A shape, color, texture, or other characteristic of a periphery of an ornament, as presented and viewable at the first side 101, can constitute a part of the character-embodied portion of the design 104, or can comprise a border, frame, ornamentation, label or other similar feature which is not directly considered part of the character-embodying portion of the design. In either situation, a portion of a design 104 presented at or near any part of the periphery of the first side 101 of an ornament is considered part of the overall design 104 of an embodiment of an ornament 100. It will be understood, therefore, that a periphery (e.g., perimeter, outline, border, etc.) of an ornament 100 can be, for example, a geometric shape, a shape corresponding to one or more visual features or elements of the character-embodying portions of the design 104, or a shape relatively unrelated to one or more features or elements of the character-embodying portions of the design 104. The scope of the inventive embodiments of a periphery shape is therefore contemplated to be extremely broad.

As described above and depicted in FIG. 1*b*, an embodiment of an ornament 100 also has a second side 103, typically (but not exclusively) possessing a relatively planar surface 105, or at least a relatively planar portion of its overall surface 105. In use, an ornament described herein is typically affixed to a surface, object, or other structure, and the first, design-bearing side 101 is primarily presented for view, although this is not true for all uses, some of which contemplate both sides being presented for viewing (such as when applied to a window). Therefore, the first side 101 typically bears the primary, identity-embodying design 104 of the ornament 100, and the second side 103 generally does not bear the primary design 104. At least one embodiment, however, does include a representation of the primary design of an ornament being presented simultaneously and/or alternatively on the second side 103 of the ornament 100.

Additionally, the second side 103 can also bear an alternative design (e.g., textual, graphic, etc.) presented at its surface 105, such as an identity of an entity (e.g., manufacturer, owner, commercial advertiser, etc.), instructions for use, user warnings, or others. The second side 103 may include one or more of the same colors as the first side 101, or may include one or more colors which different those presented at the first side 101, or may omit any one or more or all of the colors presented at the first side 101.

According to a preferred embodiment, the dimensions of an ornament 100 are found in the ranges of approximately one and three-quarters inches to two and one-half inches (1.75"-2.5") wide, one and three-quarters inches to two and one-half inches (1.75"-2.5") tall, and three-sixteenths to three-eighths (0.1875"-0.375") thick. An ornament 100 provided with dimensions in this size range is sufficiently large to be easily to grasped by small hands, and to be difficult for a small child to swallow. At the same time, this size range provides an ornament 100 which is less prone to being torn, can be durably attached to a substrate by a single hook-and-loop fastener coupling, and fits within the dimensions of a relatively standard size of an ornamental trading card (described below). However, the embodiments are not so limited, and contemplate ornaments both substantially larger than (for example, ten times (1000%) larger) and/or smaller than (for example, one-fifth (20%) as large) the dimensions described relative to the preferred embodiment.

Securely affixed to, and generally but not exclusively at or proximate to the approximate center of the second side 105 (as depicted in FIG. 1*b*), is one or the other of a hook portion (e.g., having hook elements) or a loop portion (e.g., having loop elements) 106 of a hook-and-loop fastener. Those having skill in the art will recognize that well known and commonly available VELCRO™-brand separable, reusable, fabric fasteners represent one example of a broader family of fastener configurations collectively known as hook-and-loop fasteners. Various hook-and-loop fastener configurations provide for relatively easily separation of the reciprocal hook-and-loop portions of a fastener, while other configurations provide for couplings which are extremely resistant to separation, requiring high levels of a separating force to achieve separation. All forms and configurations of hook-and-loop fasteners are contemplated in alternative embodiments of the invented system.

As shown in FIG. 1*b*, a portion 106 of a hook-and-loop fastener coupled with and comprising an ornament 100 can be configured as a round 'coin', but the embodiments likewise contemplate other shapes as well (collectively referred to herein as coins, or fastener coins), including a shape closely corresponding to the outline of the ornament 100 itself. Generally, the positioning and/or diametric dimensions (whatever the outer shape) of a fastener coin 106 will not extend beyond the periphery of an ornament 100 with which the coin 106 is affixed. This size relationship is more for aesthetic considerations than for any particular functional considerations, and so the embodiments are not so limited.

Figure 2:
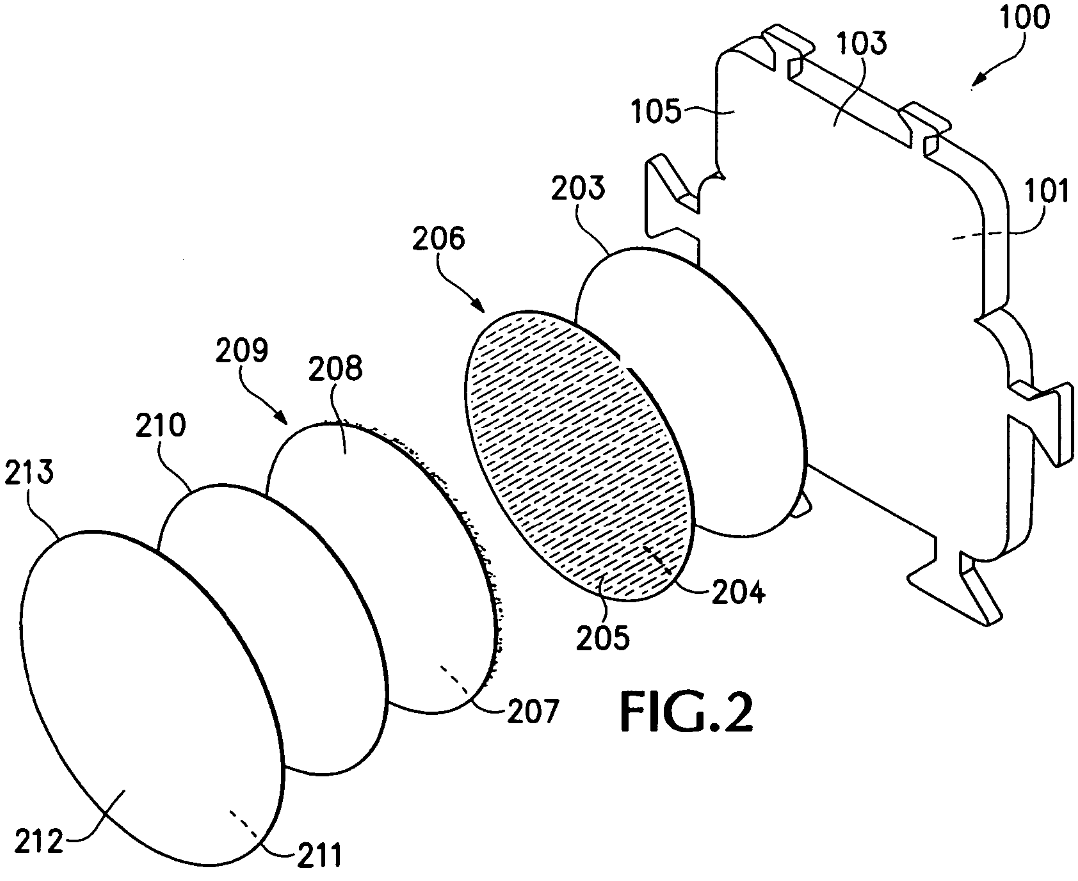
FIG. 2 depicts in exploded isometric view an arrangement of attachment elements and an ornament according to an embodiment of the invention.

Referring now to FIG. 2, a typical assembly is shown, in exploded view, of an embodiment of an ornament 100 and its associated hook-and-loop fastener arrangement. Ornament 100 has a first design-bearing side 101 and an opposing second relatively planar side 103. Positioned adjacently and in a parallel-planar relationship with the second surface 105 of the ornament 100 is a coin 206 comprising a portion of a hook-and-loop fastener. Coin 106 has a first side 204 facing and positioned approximately centrally relative to the outer periphery of the second surface 105 of the ornament 100, although positioning need not be approximately central in all embodiments.

Interposed between the second surface 105 of the ornament 100 and the first side 204 (hereinafter referred to as the 'third surface 204') of the coin is disposed a first expanse of an adhesive material 203. The adhesive material is configured (e.g., formulated, prepared, applied, etc.) so as to provide a strong, durable, relatively high-tensile strength bond coupling the third surface 204 with the second surface 105. Additionally, other characteristics such as heat-resistance, fast curing time, ultra-violet energy resistance, pressure-sensitivity, non-toxicity, non-out-gassing, and others, also provide benefits, although this list is neither complete nor exclusive. Indeed, the contemplated scope of embodiments embrace any one, combination, or totality of these and/or other characteristics as may be understood in the art to provide benefits in an application requiring repeated attachment and detachment, and direct use and handling by children.

As would be recognized by one having skill in the art, the material composition, texture, and other characteristics of the third surface 204 and the second surface 105 can and may vary in numerous contemplated embodiments. Therefore, the adhesive material 203 may vary in one embodiment as compared to another, but generally must be able to form the described bond whether the materials and/or surface characteristics of the respective second and third surfaces are similar or different.

Adhesive material 203 can comprise an adhesive substance disposed directly at either of the second surface 105 or the third surface 204, or can comprise a relatively inert central layer (e.g., a film, sheet, etc.) having one or more adhesive materials disposed at each of its respective sides. In the latter described form, an adhesive material disposed at one side of the central layer may be particularly suitable for bonding with a material of the second surface 105, while an adhesive material disposed at the opposing side of the central layer may be particularly suitable for bonding with the third surface 203. In the former described form, an adhesive material 203 can be disposed as a relatively unitary mass (e.g., disk, wafer, etc.) of a relatively solid or semi-solid (e.g., gel, paste, etc.) adhesive material.

Alternatively, the adhesive material 203 can be disposed as a relatively liquidous (e.g., in a liquid or semi-liquid state) adhesive material applied by spraying, brushing, rolling, or another means or method as is known in the art of adhesive application. An applied adhesive material 203 can then be at least partially cured in situ as disposed, but post-disposition, pre-adhesion curing is not required in one or more embodiments.

The adhesive material 203 may more typically be a pressure-sensitive adhesive, but in other embodiments the adhesive material 203 may be activated for bonding by the application of thermal energy, a chemical substance, water, or by some other means as known in the art. In an illustrative embodiment, the adhesive material 203 is a specially formulated, heat-resistant water-based, pressure-sensitive acrylic adhesive identified as VELCRO™ #75. Therefore, the examples listed herein are strictly illustrative, and are not intended to restrict or limit the broader scope of contemplated and suitable embodiments.

An outer periphery of the adhesive material 203 may be coextensive with the third surface 204, but generally does not extend beyond it if such excess will result in exposed adhesive material when the hook-and-loop coin 206 is coupled with the third surface 105. Of course, the adhesive material 203 need not be fully coextensive with the third surface 204, nor must the adhesive material 203 be disposed as a single contiguous layer or pattern in all embodiments, but rather can be disposed as spots, lines, grid patterns, or any other pattern which provides a strong, durable bond as described above. In general, at least a portion of a first expanse of adhesive material 203 is presented in a parallel-planar relationship with either one or both of the second surface 105 and the third surface 204.

The hook-and-loop fastener coin portion 206 comprises one portion of a complementary hook-and-loop fastener assembly (e.g., arrangement). Therefore, the invented system also contemplates any detachable engagement with a reciprocal hook-and-loop fastener portion ('reciprocal coin'), included in a typical embodiment.

The reciprocal fourth surface 205 of hook-and-loop coin portion 206 and fifth surface 207 of the reciprocal coin portion 209 each are configured with one of each a 'hook' portion of the hook-and-loop fastener arrangement, or the reciprocal loop portion thereof, such that each of the hook and loop portions are present in any engaged assembly of coin 206 and reciprocal coin 209. To facilitate universal interchangeability of ornaments 100 within an embodiment of the invented system, standardization may be imposed such that a coin including the hook portion of the hook-and-loop fastener assembly is always provided securely coupled with the second surface 105, to engage with loop portions wherever placed. Of course, the converse arrangement may also be employed within an embodiment.

Alternatively, an embodiment is contemplated wherein at least one ornament 100 is affixed with a hook-type fastener coin 206, while at least one other ornament 100 is affixed with a loop-type fastener coin 206, and reciprocal coins 209 of both the hook and loop type are provided. Therefore, each ornament 100 may be coupled with only a subset of the available reciprocal fastener coins 209 wherever placed. An advantageous benefit of this latter embodiment includes preventing siblings from appropriating and using one another's ornaments 100, where one sibling or friend possesses ornaments 100 having either only hook or only loop-type fastener coins 206 and its reciprocal fastener coin(s) 209 for placement, while the other sibling or friend possesses ornaments having only the other type of fastener coin 206 and its reciprocal coins 209. Therefore, each sibling's or friend's ornaments 100 are not interchangeable for use with the other sibling's/friend's placed reciprocal coins 209, and unpermitted appropriation is deterred.

As is further depicted in the embodiment shown in FIG. 2, reciprocal coin 209 typically, but not exclusively, includes a second expanse of adhesive material 210 disposed at a sixth surface 208, the sixth surface residing at a side of the reciprocal coin 209 opposite the hook or loop-bearing fifth surface 207. Nearly all descriptions provided above regarding the composition, extent, application, activation, form, and other characteristics of adhesive material 203 likewise may apply with regard to the many and varied contemplated embodiments of adhesive material 210, excepting of course the respective and differing locations of each within an ornament and hook-and-loop fastener assembly.

In a typical but non-exclusive embodiment, adhesive 210 is a pressure-sensitive adhesive configured for bonding with a seventh surface when the adhesive-covered sixth surface 208 is placed adjacently to and compelled into intimate contact therewith for a suitable duration by an applied force. In embodiments employing a pressure-sensitive adhesive material at 210, it may be generally desirable to delay adhesion of the adhesive material until a suitable and user-selected seventh surface is identified. Therefore, a liner material 213 ('liner') is provided at the otherwise exposed bonding surface of adhesive material 210. The liner 213 typically but not exclusively includes a first side 211 (eighth surface 211) placed proximate to and in contact with the second expanse of adhesive material 210, and an opposing second side 212 (ninth surface 212) presented opposite adhesive material 210.

Liner 213 further typically includes a relatively contiguous expanse of an adhesive release material disposed at the eighth surface 211. A selected adhesive release material may not be the same in all embodiments, as different formulations and/or types of adhesive materials used for the second expanse of adhesive 210 may possess widely varying adhesive properties. Therefore, the suitability of a release material used for liner 213 is generally determined based upon the adhesion characteristics of the selected adhesive material 210 relative to the release material.

In general, a suitable release material will be one with which the adhesive material 210 of the second expanse will bond relatively weakly. Using functional language to clarify a material characteristic, the bond between the adhesive 210 and the release material should be sufficiently strong to maintain the liner 213 in position relative to the reciprocal fastener coin 209 during ordinary shipping and handling, thus preventing inadvertent and/or premature separation, while also being sufficiently weak to allow separation and/or release therefrom with a relatively minimal applied tensile (e.g., peeling) force. For further clarification, the qualifier 'relatively minimal' means, in a typical but non-exclusive embodiment, that a tensile force threshold sufficient to achieve release of the liner from the adhesive should be sufficiently low relative to the cohesive strength of the adhesive, that little or no adhesive material 210 is removed from the sixth surface 208 when the liner 213 releases from the second expanse.

One example of a release material providing benefits in one or more of the described embodiments is silicone, as silicone characteristically does not strongly bond with a large number of adhesives.

In an exemplary but non-exclusive embodiment, reciprocal hook-and-loop fastener portion 209 is adhered to a user selected surface by removing the liner 213 to expose the second expanse of adhesive material 210, placing the adhesive covered sixth surface 208 into contact with the user selected surface in a substantially parallel-planar condition, and applying for a duration a compressive force, urging the hook-and-loop fastener portion 213 and the corresponding surface into intimate proximity, one with the other. Other operations may also be undertaken, or listed operations omitted, as is appropriate for the type of adhesive and/or surface, to form a strong and lasting adhesive bond with the selected surface, as will be understood by those having skill in the art.

As this embodiment suggests, the invented system includes additional provided reciprocal hook-and-loop coin portions 209 in an embodiment, so that a user can affix them at a plurality of seventh surfaces. Therefore, the user can easily and interchangeably move an ornament 100 from one of a seventh surface location to another of a seventh surface location, for attachment with any of a plurality of affixed reciprocal coins 209.

The embodiments of the system, however, contemplate a far greater range of affixation means, structures, and methods than simply adhering a reciprocal fastener coin 209 at a user selected surface. For example, a user may not wish to adhesively attach a reciprocal coin 209 with a surface of an article of clothing, or an article with which a user wants to attach an ornament 100 may not possess a sufficiently large surface area or suitable surface for adhesively affixing a reciprocal hook-and-loop fastener coin 209 therewith. These are just a few examples, but the embodiments contemplate and accommodate a great mean other reasons and/or situations. Therein lies the tremendous variability and scope of the invention according to its many embodiments.

Directing attention now to FIGS. 3*a-h*, a small subset of embodiments are depicted wherein interchangeable articles including detachable coupling members may be used to couple an ornament with any of a wide range of articles, structures, surfaces, etc. In general, each of the articles depicted in FIGS. 3*a-h* include a relatively planar surface 302 (herein, referred to as a 'seventh surface'), texturally and compositional configured to accommodate a strong and lasting bond with a second expanse of adhesive material 210. Additionally, seventh surface 302 is at least co-extensive with sixth surface 208, and could extend beyond an outer periphery of the sixth surface 208 in one or more embodiments.

Figure 3A:
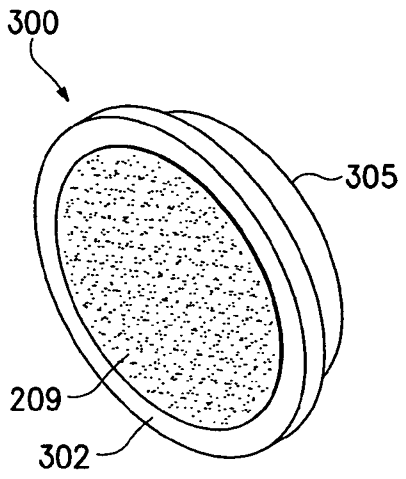
FIGS. 3*a-h* depict a plurality of articles configured for detachable engagement with an ornament, and further configured for detachable engagement with a user-selected substrate, according to one or more embodiments of the invention.

FIG. 3*a* depicts an interchangeable article according to an embodiment of the system, wherein a detachable coupling member comprises a magnetized material (e.g., a magnet) operatively coupled relative to the seventh surface 302 such that the article can be magnetically coupled with a magnetic surface while supporting an ornament 100 coupled with the fifth surface 207 of a reciprocal hook-and-loop fastener coin 209. Magnet 305 can be constructed of nearly any material (or composition of materials) capable of maintaining a magnetic field (e.g., ferrous magnet, Alnico magnet, etc.), as are known in the art. Magnet 305 can be mechanically or adhesively coupled with the structure including the seventh surface 302, or can be integrally formed therewith. In at least one embodiment, magnet 305 may itself form seventh surface 302, obviating any necessity for providing a separate seventh surface-bearing structure.

One having ordinary skill in the art will recognize that an embodiment according to FIG. 3*a* enables coupling an ornament 100 with user-selected commonly magnetic surfaces, such as a refrigerator door, a portion of a car, a metal file cabinet, etc., while also allowing relatively easy detachment therefrom.

While FIG. 3*a* depicts one particular arrangement of the depicted features/elements therein, the embodiments are not so limited. As likewise applies to FIGS. 3*a-h*, the relative shapes, sizes, thicknesses, materials, and other such characteristics of the depicted detachable coupling member, seventh surface-bearing structure, and/or reciprocal hook-and-loop coin 209 can be altered in numerous ways without departing from the spirit or scope of the contemplated embodiments, as will be understood by one having skill in the art.

Figure 3B:
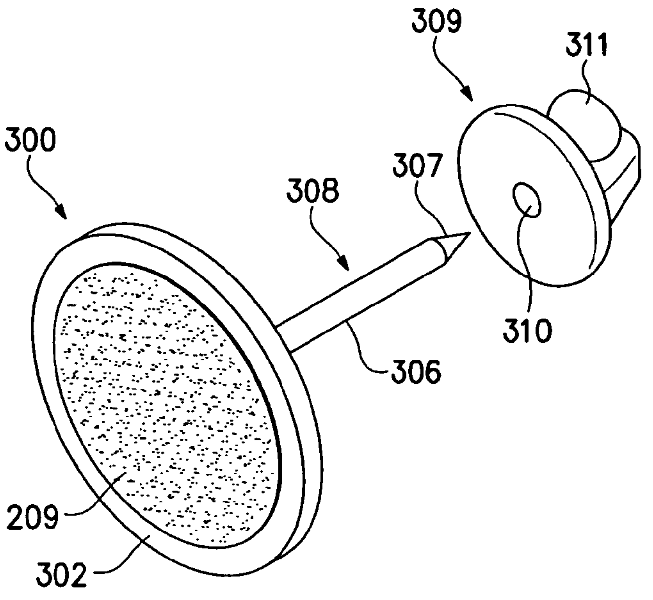

FIG. 3*b* depicts another form of detachable coupling member configured as a pin 308, or alternatively as a pin 308 and clasp 309 arrangement. Pin 308, typically but not exclusively comprising a shaft 306 terminating with a pointed end 307, is configured for inserting into and/or through a substrate. For example, a substrate can include a suitably penetrable material of a bulletin board, a wall, etc., enabling affixation of an ornament thereto. Likewise, pin 308 can be inserted through a substrate such as an item of apparel (e.g., a hat, jacket, tie, shirt, etc.), any fabric and/or sheet-like material (e.g., a curtain, a lampshade, a backpack, etc.), and can be securely affixed thereto utilizing a clasp 309 as are known in the art. FIG. 3*b* depicts one type of clasp 309 having an opening 310 configured to receive pin 308 inserted therein, and latching mechanism 311 configured to operatively and securely, yet detachably couple with the pin 308.

Pin 308 can be coupled with the article 300 in either a fixed, relatively immobile manner, or in a pivotally movable manner, or in any other manner suitable for operatively coupling an article 300 and an ornament 100 with a user-selected pin-penetrable substrate. Likewise, a clasp 309 can be formed integrally with a pin 308 (e.g., similar to a safety pin catch, etc.), or can be formed integrally with the article 300, or as shown in FIG. 3*b*, can be a wholly separate structure configured for operative engagement with a pin 308. An article can likewise include more than one detachable coupling structure (e.g., magnet, pin, pin/clasp, or others as described below and otherwise contemplated), although not depicted in FIGS. 3*a-h*.

Figure 3C:
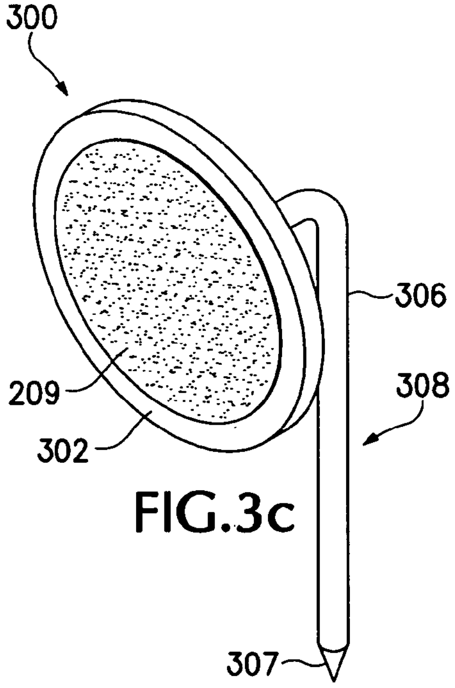

The embodiment depicted at FIG. 3*c* also includes a pin 308, configured differently from that in FIG. 3*b* to demonstrate that variation from the depicted and described embodiments is nevertheless well within the scope of the contemplated embodiments. The pin 308 of FIG. 3*c* includes an angled bend in the shaft 306, such that the pointed end 307 is directed ninety-degrees and is somewhat lengthened relative to the pin 308 depicted in FIG. 3*b*. Although the embodiments differ in one or more manners regarding the arrangement and/or basic configuration of the features/elements, each embodiment represents a relatively consistent detachable coupling concept. Although the embodiment of FIG. 3*b*, as discussed above, may suggest that attachment to a fabric and/or sheet-like material generally utilizes a clasp 309 engaging a pin 308, one having ordinary skill will recognize that the pin 308 (e.g., sometimes referred to as a 'stick pin', etc.) of FIG. 3*c* can also securely couple an article 300 and an attached ornament 100 with, for example, a garment, a bulletin board, etc.

Figure 3D:
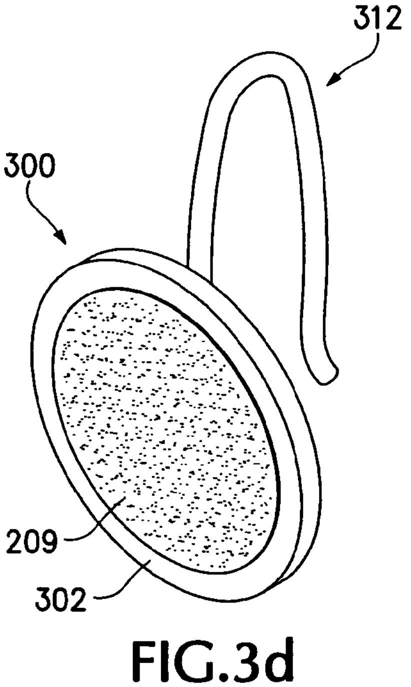

FIG. 3*d* depicts a hook-like detachable coupling structure 312, but could just as easily depict, for example, a spring-tensioned clip suitable for compressively retaining article 300 coupled with a belt, lapel, hat brim, pocket, purse lip, a pet collar, etc. Hook-like structure 312 can be used to hang article 300 from, for example, a pierced ear, a horizontal rod, a picture frame, a sun-visor in a car, etc., and can be altered in size, length, material, surface finish, cross-sectional shape, and/or other operative and/or aesthetic characteristics. Alternatively, a closable clip (e.g., such as a carabiner, slide-lock clip, or other) can likewise be substituted, either fixedly or movably coupled with the article 300.

Figure 3E:
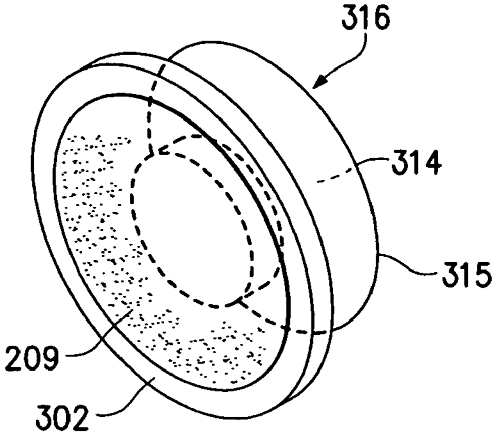

For suitable substrates, the embodiment represented at FIG. 3*e* enables detachably affixing an ornament via a suction cup-like structure 316. A suction cup typically comprises a flexible, concave structure capable, when properly oriented relative to a smooth substrate surface and subjected to an applied force, of deforming and expelling air from the concavity 314. Upon removal or reduction of the applied force, a rim portion 315 and/or surfaces of the concavity inward from and proximate to the rim portion 315 form a relatively hermetic seal, effecting a negative pressure (e.g., semi-vacuum) in a space between the concavity 314 and the substrate. Therefore an article detachably coupled with an ornament 100 can be coupled with a relatively smooth substrate such as a surface of a window or other glass article, or nearly any other relatively smooth surface capable of forming and maintaining (at least temporarily) a hermetic seal with a suction cup, substantially as described.

Figure 3F:
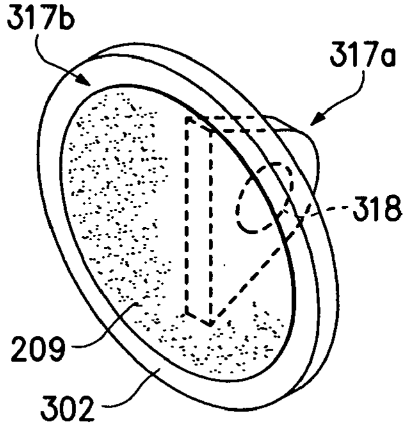

FIG. 3*f* depicts an article substantially similar to those already described, however the structure enabling attachment of the article in the embodiment of FIG. 3*f* comprises an opening 318 formed through a portion of the article. The article can include a projecting structure 317*a* through which one or more openings 318 (e.g., perforations, through-holes, etc.) are provided, or an opening can be provided through substantially the same portion of the article which includes the seventh surface 302, such as at position 317*b*, as just one example. The possibilities according to the contemplated alternative embodiments are expansive rather than limited. As with all of FIGS. 3*a-h*, the figures are illustrative only, and even structures presented in substantially identical form throughout the figures are not intended to limit the scope of the embodiments. The opening can be rigidly formed, can be formed so as to remain open permanently, or can be configured as a slit through a flexible material, thus opening and closing by introduction and withdrawal, respectively, of either or both of an applied force or an intervening object.

The embodiment substantially depicted in FIG. 3*f* may be utilized in a great number of situations. For example, as a button for an apparel item, a zipper-pull, a keychain 'fob', a pendant, or nearly any other use for which an opening provides an attachment and detachment means for an operatively coupled ornament 100.

Figure 3G:
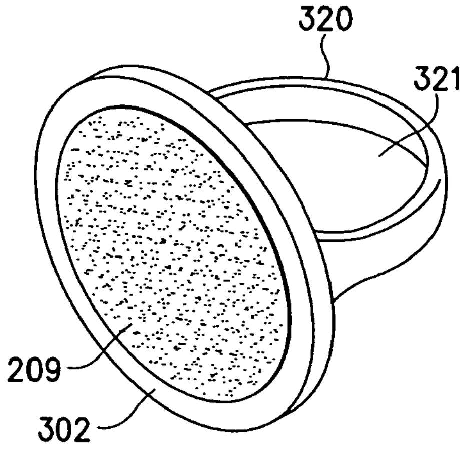
Figure 3H:
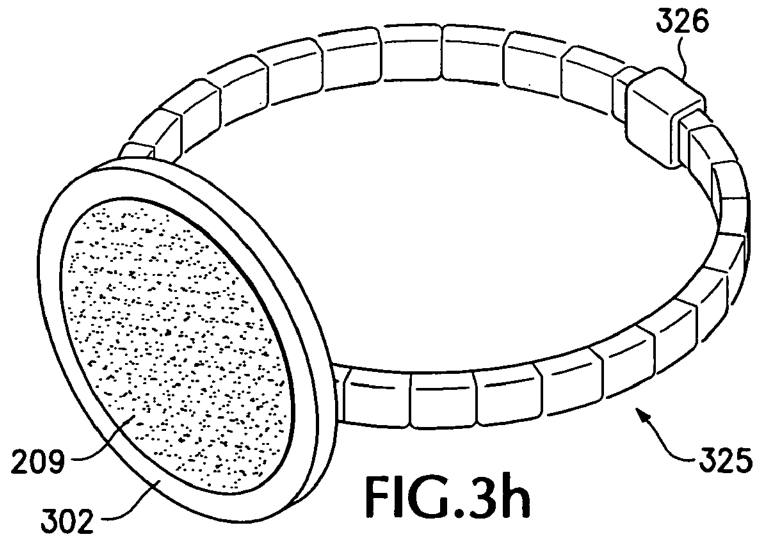

FIGS. 3*g-h* present embodiments wherein an ornament is wearable as an item of jewelry for example, although the depicted embodiments are not limited to such use. FIG. 3*g* depicts an article, as described above, coupled with a ring-like structure 320. The size of an opening 321 within the ring can vary in embodiments, providing for various uses. For example, ring 320 can be worn on a user's finger, or can be used as a napkin ring, as a curtain gather, or any number of other uses. Ring 320 can comprise a relatively broad band, or can be a relatively narrow wire, or anywhere in between. Likewise, nearly any material can be used to form ring 320, including but not exclusively so, wood, plastic, metal, or any other suitable material.

FIG. 3*h* substantially depicts a deformable, elongated structure 325 coupled with a seventh surface-bearing article. By deformable, the embodiments encompass structures which, for example, can be alternated between a relatively linear condition and a relatively non-linear condition. Inasmuch as a some deformable, elongate structures 325 may comprise an unbroken, relatively circuitous form, and never assume a truly linear condition, but could fit the above description if a break in the circuit was provided, the embodiments encompass such structures as well.

According to alternative embodiments, a deformable, elongated structure 325 can comprise a string, chain, wire, ribbon, band, rope, cable, or any other similar structure, whether segmented, braided, twisted, interlocked, solid, hollow, whether single or multi-stranded, whether flexible throughout or articulating only at joints between otherwise relatively rigid segments, etc. By 'deformable', it is intended to convey that an elongated structure 325 is not rigid, but rather can be bent, wrapped, folded, twisted, stretched, compressed, etc. according to alternative embodiments. Thus, the contemplated embodiments are expansive rather than limited.

In an embodiment, one such non-rigid elongate structure includes a capture member proximate a first end, the capture member configured to engage a second portion of the elongate structure urged into confrontation with the capture member. For example, the capture member can be a clasp on a necklace or bracelet. A seventh surface-bearing article can be integrated with the elongate structure, or can be attached thereto in either a relatively fixed or movable manner. In an embodiment, the deformable elongate structure 325 comprises a relatively elastic structure capable of increasing and decreasing in length and/or circumference upon the application of an operative force (e.g., as by pulling, stretching, etc.).

The elongate structure 325 can be formed, but not necessarily exclusively so, of a fabric, of plastic materials (including polymers, rubber, etc.), metal, wood, or nearly any other material or combination thereof from which a deformable, elongate structure can be formed, as will be understood by one having skill in the art. Examples of an elongate structure 325 in alternative embodiments can be used as an elastic hair gather, a necklace, a belt, a sash, or other similar arrangements or devices, whether wearable or non-wearable. Therefore, the embodiments as contemplated are expansive rather than limited.

As described above, the invented system according to its numerous embodiments enables design-bearing ornaments to be affixed at a large number of surfaces, and/or with a large number of structures, articles, etc. Further, any of a plurality of different design-bearing ornaments can be interchangeably attached to and/or detached from any of the plurality of surfaces, articles, structures, etc. which bears a reciprocal hook-and-loop fastener portion relative to that coupled with the second surface of the ornament.

Thus, a child, for example, can affix interchangeable ornaments with a substrate/surface of nearly any object he or she encounters, and can easily move the ornaments around at his or her wish, will, and whim. Each of the embodiments depicted in FIGS. 3*a-h* can be considered an 'intermediate attachment structure', configured for detachable attachment of an ornament, but also configured for attachment (e.g., either detachably or relatively permanently in alternative embodiments) to any one or more of the great variety of substrates and/or surfaces to which one might conceivably wish to affix an ornament as described herein. No other entertainment system identified or known in the prior art provides such a broad level of interchangeability generally, nor specifically as part of a thematic, ornamental design-embodied, character-centered entertainment system. However, the invented system is broader than, and incorporates more depth and richness, than what is described in detail above. Each character design embodied in an ornaments can further be provided within, for example, a contextual, interactive game environment.

An interactive game can be embodied in device-executable code (e.g., software, firmware, etc.) stored at a data storage medium (e.g., magnetic, optical, solid-state, etc.), and configured, when executed by or on an electronic device (e.g., computer, game system, etc.), to present a user-interactive game sequence at a display of a display device. The game sequence, according to a typical embodiment, includes visual features corresponding with the design-bearing first surface of one or more ornaments as described above. In one or more exemplary embodiments, an interactive game is configured as a treasure hunt through the garden of the character 'Robert Robot', where the users and/or the characters attempt to locate one or more 'hidden' items and/or other characters, or a chase game wherein players attempt to 'catch' the 'Bella the Bee' character, for example.

Other character-featuring thematic game sequences are also contemplated as part of the overall interactive game. For example, a sequence can include a matching card/memory game conducted at the home of one of the characters, while another embodiment features a character trivia game wherein players are asked to answer questions based on character information presented on, for example, the ornamental 'trading' cards, or based on information developed during a game sequence that the player has already performed.

Figure 4:
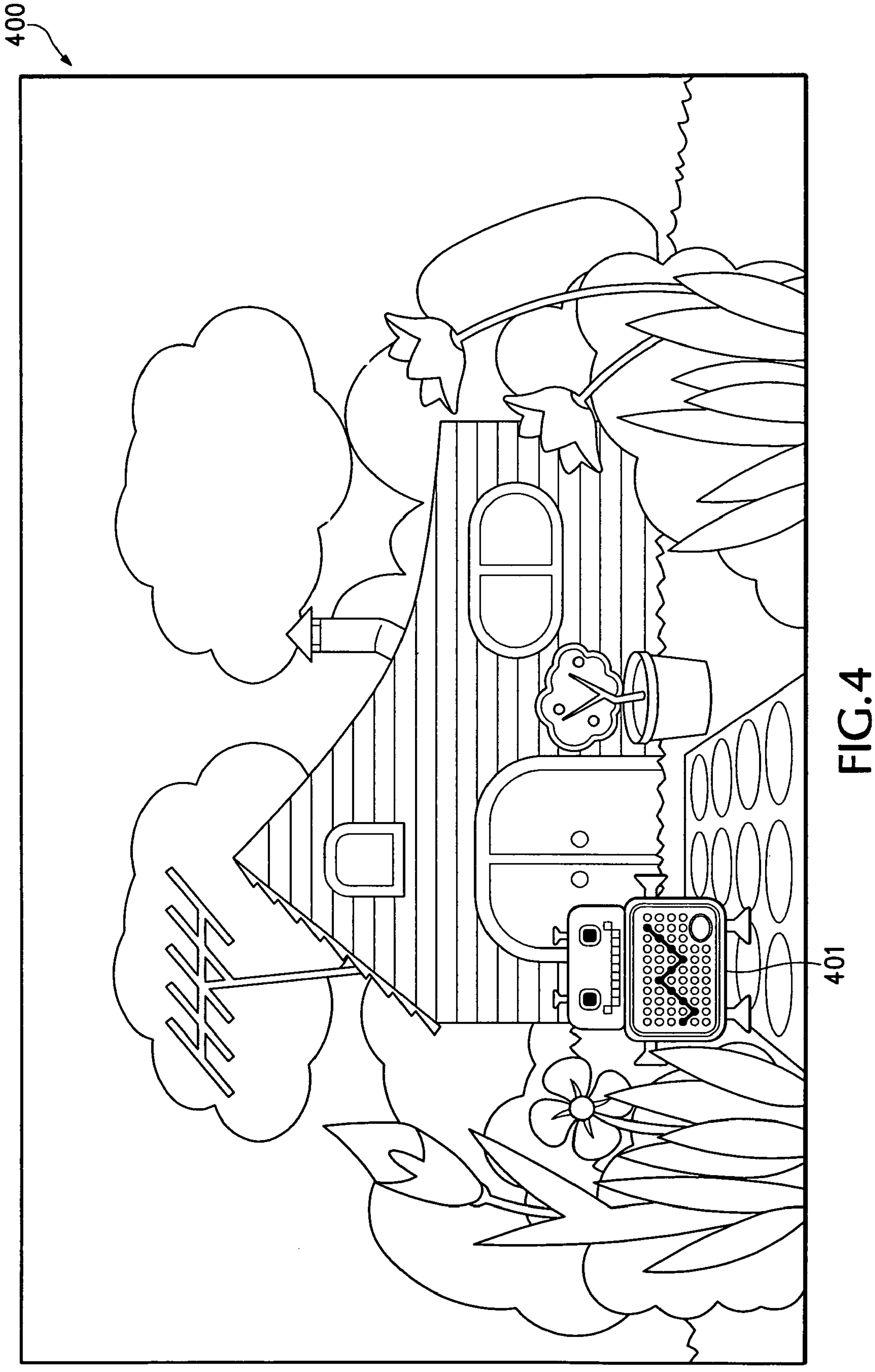
FIG. 4 depicts a viewable screen-shot image presented as part of an interactive, thematic game according to an embodiment of the invention.

FIG. 4 depicts the ornamental design-embodied character 401 of FIG. 1 in a screenshot image 400 from just such an interactive game according to an embodiment. As can also be seen, one or more of the visual elements (e.g., house, flowers, clouds, etc.) of the image 400 correspond aesthetically with the character design 401, although such aesthetic correspondence is not necessary in all embodiments. Thus, the character 401 can alternatively be placed visually against a real-world photographic background in one alternative embodiment, without departing from the thematic nature pertaining to the embodiment.

Also demonstrating and maintaining elements of the thematic nature of an invented system embodiment, each ornament-embodied character appearing in the interactive game will encounter situations, operate within a depicted environment, and/or interact with other characters according to one or more of the fictional 'facts' or characteristics assigned to that character. Awareness by the user of one or more of these characteristics may be integral to proceeding properly through a game 'script' or sequence, or acquisition of such awareness may be a purpose of a game. The embodiments, however, are expansive rather than narrow as would be recognized by one having ordinary skill in the art in light of the description provided herein.

An interactive, ornament-embodied, character-centered game as contemplated herein may be remotely-accessible, as via the internet or another data-exchange network, so that a user can access and interact with an embodiment of the game from any remote terminal (e.g., computer, internet-equipped portable electronic device, etc.). However, an embodiment of the game may also be stored at a portable data storage media article or device, whether comprising a magnetic data storage medium, an optical data storage medium, a solid state data storage medium, some combination thereof, or some other type of data storage medium as known in the art.

According to one embodiment of interactivity, a user specifies which ornament-embodied characters appear in the game played by the user. In another, a user can save an particularly enjoyable game sequence for later replay, either personally or by another with whom the user shares the game sequence. In yet another embodiment, one or more users, either at a single location or remotely located one from another, can participate with one another (e.g., cooperatively or competitively) within a common game sequence. In still another embodiment, everything that happens relatively to a character in a game can be added to and saved in a character profile, thereby enriching the dimensions and complexity of the thematic, ornamental design-embodied characters, and increasing the types of thematic relationships existing or recognizable among a plurality of the characters. Of course, an embodiment also allows a player to save a game currently in progress, and to return to the same game at a later time to resume playing at substantially the same position within the game sequence.

Within an embodiment of an interactive, thematic game sequence, users (players) can receive points according to an assigned point value system, wherein the point value system is one of pre-programmed into the game uniformly for all users, or is alterable by a player of another based upon characteristics of the player (e.g., age, experience level, physical or intellectual capabilities, etc.), or is otherwise adjustable by either a game provider, a player, or another. Players who accumulate a number of points (e.g., 1 to n) corresponding to one or more particular virtual game rewards can then exchange their points of the user's choice of a corresponding reward, or may receive a specified reward automatically with an automatic and corresponding deduction of one or more of the player's accumulated points.

In an embodiment of a treasure hunt game, a passport (e.g., either actual or virtual, or both) allows a player to receive ornaments (e.g., either actual or virtual, or both) corresponding to each item found during the game (e.g., a found item could be a previously hidden ornament), and collect the ornaments in the passport. Either or both of a discovered virtual ornament or an obtained actual ornament, in an embodiment, can contain an indication of a special authorization (e.g., a 'golden ticket') enabling the player to receive a special prize.

As contemplated herein, the described interactive game provides both an opportunity to further develop thematic relationships among a 'community' of ornamental design-embodied characters, as well as an opportunity for a user to play with the characters according to already established thematic relationships and elements. Additionally, a thematic interactive game may also present contextual environments and/or situations to a player, further adding to the richness and conceptual texture of the thematic entertainment system embodiments. For example, such locations as "The Collapsing Towers at Turtle Tunnels", a virtual and/or conceptual apartment complex where one or more of the characters 'live', and the encompassing "Nakland" within which many of the game sequences are set and across which the characters can 'travel' in an ornament-embodied flying machine design/character, provide a contextual framework for even extended play and imagination beyond the bounds of an interactive, thematic game.

Therefore, as described, the ornament-embodied, character-centered thematic elements abound within embodiments of the invented system, and particularly within the visual, contextual, and interactive framework of the described interactive game embodiments. The elements of the invented system are not merely a collection of articles having similar images, but rather constitute an intimately interrelated thematic entertainment system wherein each element extends, supplements, augments, and reinforces a character-centered, user-interactive community. The interactive game enables a user to project himself or herself into the characters' 'world', and the interchangeable ornaments enable the user to integrate the characters throughout the user's life and world.

Figure 5A:
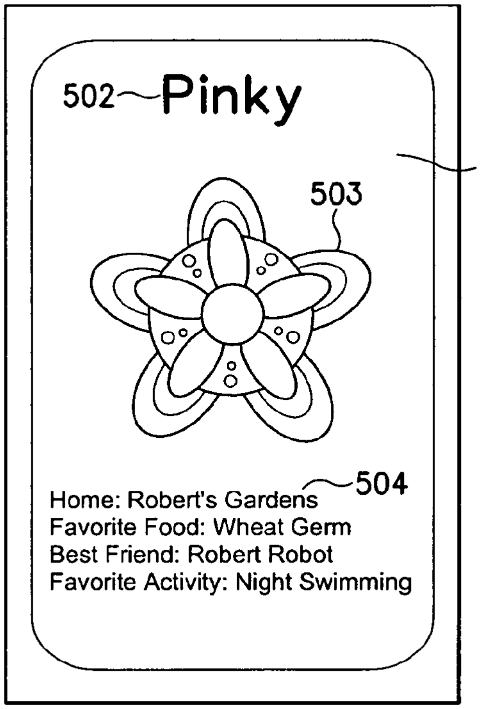
FIGS. 5*a-b* depict an elevation view and an exploded isometric view of a thematic ornamental card according to embodiments of the invention.

Further extending the elements of thematic continuity within the thematic system described herein, an embodiment includes an ornamental card which depicts and delivers character-related images and/or textual information. For example, FIG. 5*a* depicts an ornamental card 500 (e.g., trading card), which can be either flexible or relatively rigid according to alternative embodiments. An ornamental card 500 typically has a first relatively planar side 501 including a graphic design/image 503 visually corresponding to the design-bearing first surface 101 of one or more ornaments 100. The first side 501 of the depicted ornamental card 500 further includes a textual identifier 502 for the embodied character design 503, such as its unique character name (e.g., "Pinky"). Additionally, the first side 501 can include, as depicted at 504, various items of information pertaining to the fictional character embodied in the ornamental-design. For example, one or more topics (e.g., "Home", "Favorite Food", "Best Friend", "Favorite Activity", etc.) can be listed, and for each topic, one or more fictional items of information can be provided (e.g., "Robert's Gardens", "Robert Robot").

Each item of information provides an opportunity for thematic linking with one or more other 'characters' embodied in the ornamental designs, wherein another character's information relates to the information presented for a character in or more ways. For example, in the depicted ornamental card 500, the character "Pinky" is thematically related to the character "Robert Robot" in at least two ways at a first level of relatedness. "Robert Robot" is presented as being "Pinky's" best friend, and "Pinky's" home is presented as being "Robert's Gardens". The later provides a thematic opportunity for incorporating "Pinky" in a described interactive game embodiment, with Robert's Gardens being the scene of an interaction between at least these two characters, although the embodiments are not so limited.

Characters can also be thematically related at the second, third, or nth level. For example, character "A" can be related to character "B" at a first level, and character "B" is related to character "C" at a first level. Therefore, character "A" and character "C" are related with each other at a second level, through their first level relationships with character "B".

In other embodiments, two or more characters can be related by sharing a higher order commonality. For example, a thematic category "Flowers and Flurries" may be designated and/or recognized, and character designs logically relating to the category theme according to their appearance may be grouped therein. Logically related character designs can include those resembling flowers, but may also include those resembling, for example, insects and other creatures that may commonly be found interacting with flowers (e.g., butterflies, bees, ladybugs, snails, etc.). One or more thematic categories can also overlap by each including one or more character designs within their logical and/or assigned character-design membership. For example, another thematic category designated and/or recognized as "Critters and Crawlies" could include all character designs resembling living creatures, therefore possessing some overlapping membership with the "Flowers and Flurries" category. The thematic categories may be designated and/or indicated by indicia presented at to a user at, for example, an ornamental card 500, a user-perceivable portion of an interactive thematic game 400, a portion of an ornament 100, a thematic greeting card (described below), a thematic website, or at any other element the invented system.

It should be understood that such categories are not fixed and static, but rather can be recognized, created, altered, and/or ignored by a user. However, information 504 provided upon an ornamental card 500 according to an embodiment provides a means for users to begin recognizing and establishing thematic-interrelatedness in their interaction with elements of the invented system.

Likewise, the ornamental cards 500 themselves provide another method for enhancing theme-based play, by acting as trading cards to be collected, displayed, and/or exchanged between users, according to an embodiment. Accordingly, the ornamental cards 500 can have physical dimensions similar to standard trading cards, enabling the ornamental cards 500 to fit within, for example, protective trading card sleeves such as may be commercially available. For example, in a preferred embodiment, the dimensions for an ornamental card 500 may be found within the ranges of two and one-quarter to two and three-quarters of an inch (2.25"-2/75") wide, and three and three-quarters to four and one-quarter (3.75"-4.25") tall. However, the embodiments contemplate dimensions both larger and smaller than those described with regard to the preferred embodiment. For example, the embodiments also contemplate a card that is much wider and/or taller, but is folded one or more times, in one or more dimensions, such that a folded size of the ornamental card falls within the dimensions of the preferred embodiment. A thickness of an ornamental card 500 is typically approximately that of standard card stock material, as is known in the art, but can also be thicker or thinner as suitable for the material from which the ornamental card 500 is formed.

Figure 5B:
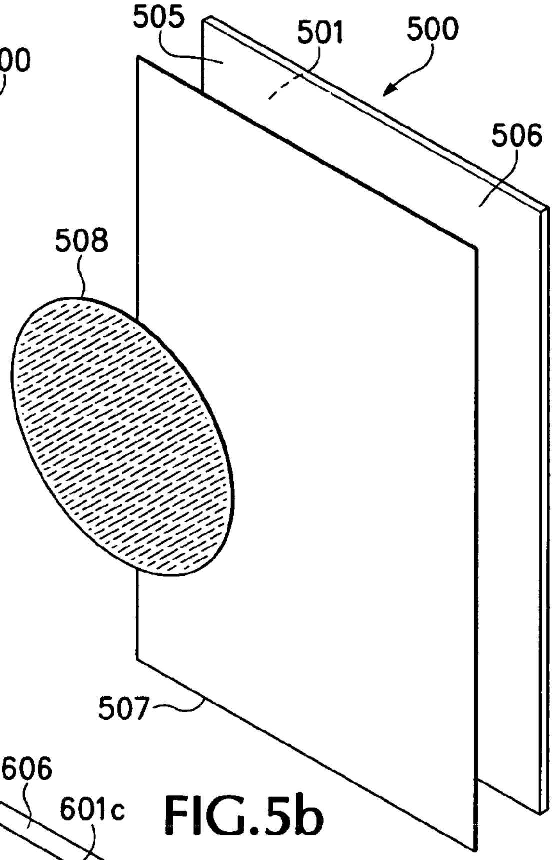

Referring to FIG. 5*b*, each card typically further includes a second side 505 opposing the first side 501 and generally parallel-planar therewith. The second side can also include graphic designs and/or textual information (e.g., thematic information, instructions for use, etc.) printed or otherwise disposed thereat, but the embodiments are not so limited.

As in the depicted embodiment, one or more of the first side 501 and the second side 505 can include an expanse of an adhesive-release material 507, which may be substantially the same as the adhesive-release material present at and described according to embodiments of the eighth surface 211 of a liner 213. The expanse of release material may be disposed at a card surface 506 of the second side 505 of the ornamental card 500 coextensively with the card surface 506, but the contemplated embodiments also include examples of less extensive coverage. Additionally, an expanse of release material 507 may be disposed at the card surface 506 by laminating a sheet-like unit of release material 507 with the surface in a substantially parallel-planar relationship, or by any other method or means understood by one having ordinary skill in the art.

An expanse of release material 507 so disposed enables the detachable attachment of one or more adhesively provided elements of the invented thematic system according to numerous embodiments. In one such embodiment, additional reciprocal hook-and-loop fastener coins 508 can be provided with and attached to an ornamental card 500 as a means of delivering said coins 209 to a user. In another embodiment, peel-and-stick stickers featuring graphic images of ornamental design-embodied characters can be provided to a user upon an ornamental card 500 surface bearing a disposed release material 507. The provided expanse of release material 507 will generally be provided and configured at least coextensively with, and configured to accommodate one, two, or more affixed items (e.g., reciprocal fastener coins 508, stickers, etc.), but the embodiments are not so limited.

And additional contemplated embodiment includes an ornamental card 500 with a release material disposed at both the first side 501 and the second side 505, and substantially and/or hermetically sealing the ornamental card 500 within the enveloping expanses of release material 507. In such an embodiment, the ornamental card 500, which may typically comprise a paper material, is rendered substantially water-resistant or water-proof, therefore extending the life of the card, and/or the environments within which the card can be used without incurring damage or degradation. However, at least one embodiment contemplates an ornamental card 500 comprising a water-resistant or water-proof material (e.g., TYVEK™, plastic, etc.).

As described above, the contemplated embodiments of an ornamental card 500 are expansive rather than narrow, and are not limited to those specifically described herein for illustrative purposes. For example, an ornamental card 500 can comprise a multi-layer arrangement. Accordingly, a multi-layer ornamental card 500 can comprising a base structural layer, one or more layers of a disposed release material directly adjacent one or more sides of the base layer, an a successive plurality of adhesively-backed layers including one or more die-cut peel-and-stick stickers with character images provided thereupon, each of the plurality of adhesively-backed sticker-bearing layers including a disposed layer of release material overlying the sticker-bearing layer, enabling separation of overlying stickers therefrom, and providing each sticker with a substantially water-resistant surface coating of release material. By the described embodiment, the total surface area of all stickers provided detachably affixed with an ornamental card 500 can exceed the total surface area of the card itself, enabling compact and efficient delivery of stickers to a user.

One having ordinary skill in the art will appreciate that alternative embodiments can include variations upon the described embodiments. For example, an outer layer of a multi-layer ornamental card 500 arrangement can itself include one or more overlying and adhesively yet detachably-coupled reciprocal hook-and-loop fastener coins 508. Thus, the contemplated embodiments extend to alternative arrangements of the described elements, extending far beyond those embodiments specifically described herein.

As described above, embodiments of the invented system include peel-and-stick stickers as a means for transferring an image to a user-selected substrate. Generally, a peel-and-stick sticker (sticker) comprises a relatively flat expanse of material having a first image-bearing side and a second adhesive-bearing side. As described, the image bearing side typically includes an image corresponding to a design-bearing side 101 of an ornament 100, although the embodiments are not so limited. For example, in broader embodiments, an image presented at a surface of a sticker can represent anything thematically-related to one or more of the ornamental character-designs.

Stickers can have a substantially flat, planar design-bearing side in one or more embodiments, but can also include a textured design-bearing side in at least another embodiment. For example, a design-bearing side can be puffy, and/or can include elevated and/or recessed portions, similar to those described above relative to the design-bearing surface 101 of an ornament 100.

A sticker can also comprise one or more of a wide variety of materials, including paper, plastic, or others, either individually or in any combination, as one having skill in the art would recognize. Likewise, the adhesive disposed at the second adhesive-bearing side can be a pressure-sensitive adhesive, a contact adhesive, a thermally-activated adhesive, or nearly any other adhesive as described above relative to hook-and-loop fastener portions, or any other as would be recognized by one having skill in the art. Therefore, the embodiments are expansive rather than narrow.

The invented thematic system includes embodiments which contemplate creative means and methods for users to exchange interchangeable ornaments 100 with each other, and for others to provide ornaments as gifts, etc. One or more of such embodiments comprise a thematic greeting card, one of which is substantially depicted in FIG. 6.

Greeting cards themselves are not novel, and many varieties exist in the art. These include cards with pop-up features, with sound-emitting devices triggered by a user opening the card, and with a variety of material, aesthetic, and lyrical variations too numerous to list herein. However, the greeting card embodiments conceived within the described thematic, ornamental design-centered system are novel relative to those existing in the art.

Figure 6:
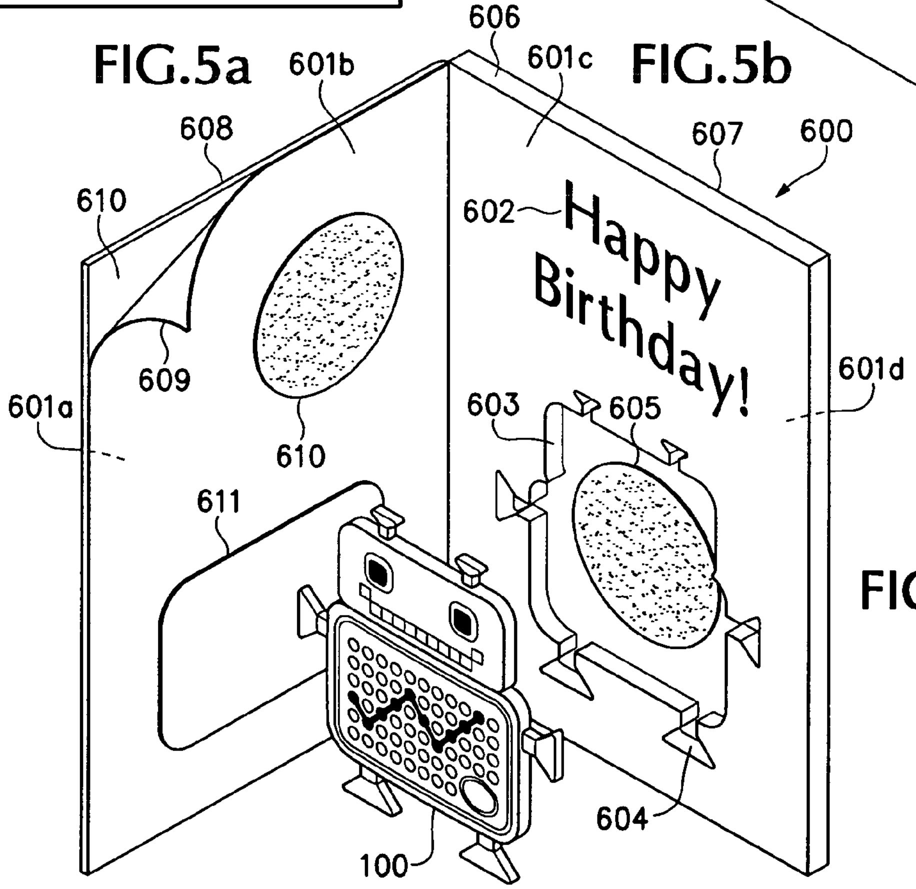
FIG. 6 depicts an exploded isometric view of a thematic greeting card according to an embodiment of the invention.

FIG. 6 depicts an opened greeting card 600 with two inner page faces 601*b*/601*c* visible. As is common, either or both of inner pages 601*b* and 601*c* can include a pre-printed message 602, which can related to a sentiment the sender wishes to convey, or to an occasion prompting the sender to send the card 600, etc., although either or both of inner pages 601*b* and 601*c* can likewise be absent any pre-printed messages.

As shown, however, the conceived thematic greeting card includes features specifically configured to convey thematic elements related to the thematic, ornamental design-centered system. For example, the depicted greeting card 600 includes a recessed pocket 603 (recess) formed into one or more of the page surfaces (here, inner page face 601*c*), constituting a retaining portion to retain an ornament 100. The recess is configured with at least a first depth 604 configured to receive substantially the entire thickness of ornament 100. By 'substantially the entire thickness of ornament 100', it is meant that card 600 is provided and configured with a thickness between card opposing card faces (e.g., faces 601*a* and 601*b*, or 601*c* and 601*d*, for example) typically exceeding a minimum thickness of ornament 100, and in at least one embodiment, exceeding a maximum thickness of ornament 100. Generally, at least a portion of a thickness of ornament 100, when received within recess 603, lies between a first plane of a first page face (e.g. 601*c*) and a second plane of an opposing and/or adjacent second page face (e.g., 601*d*), although the embodiments are not so limited.

A perimeter shape, contour, outline, etc. of recess 603 is, in an embodiment, specially configured to correspond with a corresponding shape, contour, outline, etc. of ornament 100. For example, the perimeter shape of recess 603 in the greeting card 600 closely corresponds to the perimeter shape of ornament 100, such that in the depicted embodiment, the recess 603 may receive only ornament 100, but may not receive any other differently shaped or sized ornament. Thus, card 600 according to the depicted embodiment is dedicated for use with ornament 100. However, the embodiments are not so limited.

Alternatively, recess 603 can be formed with a perimeter shape and size, and/or a depth configured to receive two or more ornaments, each having different ones of a perimeter shape, size, or a different depth, one from another. In a highly generalize embodiment, a recess 603 can be so formed as to receive any ornament within a particular range of sizes, shapes, and/or thickness, and a card 600 bearing such recess 603 is correspondingly configured to accommodate the recess accordingly.

Provided within recess 603, an embodiment of card 600 includes a retaining means configured to retain an ornament 100 at least temporarily therein. For example, recess 603 in FIG. 6 includes a reciprocal hook-and-loop fastener portion 605 adhesively or otherwise affixed with an inner surface of the recess 603. One having ordinary skill in the art will recognize that such placement enables the loop elements (for example) of reciprocal hook-and-loop fastener portion 605 to detachably engage hook elements (for example) of a hook-and-loop fastener coin 106 coupled with the second surface 105 of the ornament 100. By such engagement, ornament 100 is detachably retained within recess 603. An adhesive release material can further be disposed at the inner surface of the recess 603 interposed between reciprocal fastener portion 605 and the inner surface of the recess, enabling a user to later remove the reciprocal fastener portion 605 and affix it at a user-selected substrate and/or location.

In other contemplated embodiments, retention is obtained via other means and/or methods. For example, dimensions of the recess other than dimensions of depth, (e.g., width, height, perimeter configuration, etc.) can be provided such that a portion of the inner surfaces of recess 603 grip or otherwise restrain movement (e.g., pinch, apply friction to, etc.) of one or more portions of ornament 100. For example, such arrangement may require a user to apply an insertion force to an ornament sufficient to overcome a frictional force before ornament 100 can be inserted into recess 603. However, once inserted, the frictional force prevents ornament 100 from being inadvertently removed from recess 603 without application of a likewise sufficient force to overcome the frictional forces exerted thereupon.

In a similar embodiment, rather than providing a frictional retention pressure by constricting one or more dimensions of the recess 603 relative to a portion of the ornament 100, one or more of projecting or recessed members can be formed into the inner walls defining the depth of recess 603. A portion of ornament 100 inserted into recess 603 can therefore be received into a recessed member, or be engaged by a projecting member, retaining the ornament within the recess by either or both of a recessed member and projecting member (or a plurality of either or both) interfering with movement of the ornament 100 outwardly from the recess 603.

In yet another embodiment, a pressure-sensitive adhesive material is disposed at one or more inner surfaces of recess 603, or portions thereof. When an ornament 100 inserted is inserted into the recess, one or more corresponding surfaces of the ornament 100, or portions thereof, engage the adhesive-coated surfaces of the recess and are adhesively coupled therewith, detachably retaining the ornament 100 within the recess 603. Of course, these means and/or methods can be utilized either alone or in any combination as desired and/or beneficial.

Of course, a greeting card 600 according to the embodiments can likewise include a plurality of recesses configured according to one or more of the described embodiments or any equivalent thereof. Therefore, the conceived embodiments are intended to be broadly rather than narrowly interpreted.

To facilitate providing a recess 603 as described, a material 606 may be provided either as an operative portion 607 of card 600 and including opposing card faces 601*c* and 601*d*, or as a separate material interposed between and operatively coupled with a relatively planar sheet-like material comprising each of card faces 601*c* and 601*d*. Alternatively, material 606 can be coupled with a sheet-like material comprising one of card faces 601*c* or 601*d*, while an opposing relatively planar surface of material 606 forms the other of card faces 601*c* or 601*d*. However configured and/or arranged, the thickness of material 606 is sufficient to provide for the depth of one or more recesses 603 as described above. Likewise, a second or any additional card portion 608 operatively coupled with card portion 606 to form greeting card 600 can be configured with as described relative to card portion 606, and including one or more recesses 603 formed therein.

As an alternative to, or in addition to, a recess 603, a retaining portion can be configured as one or more openings (e.g., perforations, etc.) provided through either or both of card portions 606 and 608. Such openings, according to an embodiment, are generally arranged and formed to receive and retain a portion of an ornament 100 inserted therethrough. In at least one embodiment, a reciprocal hook-and-loop fastener portion 610 affixed at a card face 601*a-d* can comprise a retaining portion to detachably affix an ornament 100 with a greeting card 600 either instead of, or in addition to, the described recess 603.

Any or all of the retaining portions described above (e.g., recessed pocket 603, reciprocal hook-and-loop fastener portion 605/610, openings formed through a greeting card portion, disposed adhesive, etc.) can likewise be formed and utilized in an embodiment to receive and retain one or more ornamental cards 500.

As additionally depicted, a card face such as 601*b* can include an expanse of an adhesive release material 609 disposed at a surface 610 of a card portion 608. The adhesive release material of the expanse 609 can be a similar material, and/or can be similarly disposed at all or some portion of surface 610, as described relative to any of the instances of a release material described above.

Adhesively coupled with a portion of a release material 609 so disposed can be either or both of an adhesive-backed image transfer means 611 (e.g., a peel-and-stick sticker, etc.) or a reciprocal hook-and-loop fastener coin 610, either or both of which can be present individually or as a plurality thereof, according to one or more embodiments. Therefore, an embodiment of a thematic greeting card 600 includes not only a thematic ornament 100, but also includes a thematically-related image transfer means 611, one or more reciprocal hook-and-loop fastening means, and one or more ornamental cards 500, providing a user with a multi-faceted thematic-entertainment system in a fun, relatively compact package.

Further still, a thematic-greeting card 600 as described can serve as a collection, storage and/or display unit for a correspondingly-configured ornament 100. The ornament 100 can be placed within the recess 603, and the closed card 600 with the ornament 100 contained therein can be retained with others on a bookshelf or some other location, for easy reference, indexing, and access. Likewise, the card can be opened and placed upon a shelf, for example, for display, although the possible uses according to the conceived embodiments are far broader than these few described examples.

Alternatively, rather than the greeting card 600 itself, an embodiment of the conceived thematic ornament-centered system includes a display means configured with retaining portions configured to securely yet detachably retain one or more ornaments 100. The display means can be configured in the form of an album, a framed display case, a bulletin-board, or nearly any other form. The display means, according to one or more embodiments, can comprise a protective enclosure, and can include one or more types and/or instances of retention means configured to retaining one or more ornaments, ornamental cards, and/or image transferring means.

In an exemplary embodiment, an album includes a plurality of pages, each page including one or more transparent sleeve portions configured in size and shape to receive and retain at least a portion of an ornamental card 500, enabling unobstructed viewing of the information and/or graphic images present thereupon. Also present and configured as part of the page or of another (e.g., facing) page is an ornament retaining portion (e.g., hook-and-loop fastener portion, recessed pocket, perforations, etc.) configured to receive and detachably retain an ornament 100 corresponding to the ornamental card 500 retained by the sleeve portion. The album includes a plurality of such card and ornament retaining features, sufficiently separated spatially, one from another, to enable relatively unobstructed coupling of said ornamental cards 500 and ornaments 100 therein, and affording a means to easily and effectively organize, display, and obtain thematic design-bearing elements as desired by a user. The pages may also be removable from the album, individually or otherwise, and placed in another album or other display arrangement.

Of course, in alternative embodiments, display arrangement can accommodate just ornaments 100, or just ornamental cards 500, either individually or as a collective plurality, or in any other combination of thematic elements described herein. Indeed, a collection, storage, and/or display means can include retaining means for additional, not yet used reciprocal hook-and-loop fastener portions, image transfer means (e.g., peel-and-stick stickers, etc.), and/or other thematic elements according to embodiments of the invented system. Therefore, the conceived embodiments are expansive rather than narrow in scope. Likewise, in alternative album embodiments, album pages can include any one of or combination of the described retaining features, in any particular arrangement, as would be within the abilities of one skilled in the art and possessing the information provided in this description, claims, and figures provided herein.

ALTERNATIVE EMBODIMENTS

One having ordinary skill in the art will recognize that a hook portion of a hook and loop fastener (e.g., having hooking elements) can operatively couple in a hook-and-loop arrangement with nearly any material possessing loop elements presented in such manner that they can be brought within intimate proximity (e.g., into contact) with the hook elements. For example, numerous fabrics utilized in apparel items, prefabricated office (e.g., cubicle) walls, etc. can be relatively securely engaged by a hook portion of a hook-and-loop fastener, and can support a load suspended therefrom. Therefore, at least one embodiment of the invention contemplates such fabrics, however utilized, as comprising the loop portion 209 as shown in FIG. 2.

Although peel-and-stick stickers are described according to one embodiment of an image transfer means, another embodiment of a conceive image transfer means includes an ink-transferring mechanism configured to transfer ink from an ink source to an ink-receiving substrate (e.g., a surface of an article, etc.). The most common such embodiment could be configured as a stamping mechanism (e.g., a rubber stamp).

Generally, an ink-transferring mechanism includes an ink-acquiring and releasing portion configured to receive ink from an ink source, for example by being brought into contact with an ink-saturated pad, or by being supplied with ink from an ink-filled reservoir coupled with the ink-transferring mechanism, such as by gravity force, or by an applied pressure. The ink-acquiring and releasing portion generally also is configured to include a three-dimensional image inversely corresponding to a design transferable thereby. For example, in an embodiment, the image inversely corresponds to an image presented at a design-bearing surface 101 of an ornament 100. When the ink-acquiring portion is supplied with an operable quantity of ink distributed relatively fully across the three-dimensional image, and is then properly brought into contact with an ink-receiving substrate surface (as would be understood by one having skill in the art), ink is transferred to the substrate surface and forms a thematic image corresponding to the design-bearing surface 101 of the ornament 100.

An ink-transferring mechanism typically also includes a grip portion configured to be gripped by a human hand during use, and so located relative to the ink-acquiring and releasing portion as to keep the hand of a user relatively ink-free during the process of transferring ink and forming an image.

As described above, a thematic greeting card 600 can include an image-transferring means, and in at least one embodiment, one or more of the included image-transferring means is an ink-transferring mechanism as described here, coupled with and/or retained by any of the means and/or methods described above (e.g., recessed pocket, perforations, etc.).

In another embodiment, the invented system includes a remotely-accessible coloring book embodied in device-executable code retained at a data storage medium of a remote server, for example. Such code is configured, when executed by a computing device or other electronic device operatively coupled with a display device and a data-transfer network, to render one or more downloadable images viewable at the display device. At least a portion of each image corresponds with a character design embodied in at least one ornament or other element of the invented system. Generally, such images comprise at least one portion at which a user can add color according to their creative inclinations. Coloration can be added by an electronic means provided as part of the code, such as by selecting a region of the image to be colored and selecting a color to be used, or by printing a hardcopy of the image and coloring portions of the image by conventional means (e.g., crayons, chalk, ink, colored pencils, etc.). Thus, a user is provide with another thematic embodiment and element of the invented system by which to express creativity and produce a thematically-related creative product.

In at least one embodiment, the ornament-embodied designs and/or characters can comprise a recognizable mascot of a team, school, company, family, or other organization or entity, and the theme of a thematic system can include various features logically, aesthetically, or otherwise related with the team, school, or other entity. Thus, the transferable, attachable and detachable ornaments and other thematic elements of the system can provide opportunities for encouraging and/or displaying team spirit and/or affiliation, for promotional purposes, for identification, etc. It should be recognized that not all embodiments of the invented system will therefore include only character designs, but can also include solely or additionally ornaments featuring designs which thematically relate to an entity, organization, institution, definable societal unit, or other thematic grouping.

As described, ornaments can include reflective portions to enhance the visibility of a person or article with which such ornament is attached, particularly in low light conditions. Likewise, ornaments according to alternative embodiments can include glow-in-the-dark portions, and can even include, for example, an integrated battery (e.g., rechargeable, replaceable, or permanently installed, etc.) or other power source (e.g., solar power collector/converter, motion activated power generator, etc.) operatively coupled with an activating means (e.g., switch, sensor, etc.) and a light emitting means (e.g., light bulb, light-emitting diode, etc.). Thus, the embodiments can provide numerous means and/or methods for enhancing the visibility safety of a person or article with whom such ornaments are attached.

In an additional embodiment, a website is provided wherein a user can view, interact with, order, access, comment on, request, recommend, and interact with other users relative to any or all of the described elements of the invented thematic system according to one or more embodiments. Such website includes any or all of graphic, textual, and/or interactive features according to embodiments. The features and or capabilities of a thematic entertainment system-oriented website are, however, expansive rather than limited, and are too numerous to list without risking an improper inference that such listing limits the scope of the embodiments. Rather, it is generally and broadly contemplated that a thematic entertainment system-oriented website comprises an integral part of the system according to an embodiment, and can include any and/or all features and/or capabilities of websites as currently known in the art.

In light of the above provided description, and in light of the claims, figures, a non-exclusive list of advantages of the invented system and the many embodiments thereof, includes but is not limited to those described below.

The invented system provides a thematic entertainment system including nearly universally attachable, detachable, and interchangeable, design-bearing, pliant ornaments. Such ornaments can be affixed to nearly any substrate selected by a user, without requiring that such substrate be specially manufactured or constructed to receive such attachment. Further, the invented system provides a multitude of attachment structures configured to receive or include a hook-and-loop fastener portion, and further including one or more structural portions configured to effect detachable attachment of a design-bearing ornament with one or more of the afore mentioned nearly any substrate.

The invented system provides a plurality of thematic entertainment items as part of a thematic system, enabling users to further develop, recognize, and/or discover thematic relationships among a plurality of design-bearing ornaments and/or characters identified to the designs thereupon. For example, the thematic system includes elements suggesting a community relationship among the ornamental-design embodied characters, such community being embodied in fictional information assigned to each character design and elements of one or more game sequences of an interactive game embodied in device-executable-code (e.g., software). Thus, users not only learn to recognize thematic relationships within the thematic system, but further participate in developing and defining such relationships.

The invented system provides fun, interchangeable, ornaments bearing colorful and thematic designs, which a user can use to decorate nearly any and/or every item or surface in their surroundings. Apparel and accessories become ever-changeable pallets upon which a user can display their creativity, affiliation, personality, mood, or any of a multitude of other personal expressions. Further, attaching ornaments neither damages a surface or article, nor requires the same to be irreversibly converted in any substantial manner. Rather, the invented system contemplates nearly any kind of substrate surface condition, construction, texture, location, or other characteristic to which a user may wish to attach an ornament, and includes one or more attachment means and/or methods configured for attachment to such substrate surface.

The invented system provides a means and method for transferring as a gift, for storing, and/or for displaying thematic elements of the invented system, including in embodiments a specially designed and constructed greeting card arrangement. The many conceived variations of the described greeting card include features for retaining ornaments themselves, for retaining design-transferring means, for retaining ornamental cards, and for retaining attachments structures (e.g., reciprocal hook-and-loop coins, etc.).

Likewise, the described embodiments of thematic, ornamental cards provide not only additional information and bases for establishing thematic relationships extending throughout the invented system embodiments, but also themselves constitute a delivery method for functional elements (e.g., hook-and-loop fastener portions, peel-and-stick stickers, etc.), and a means for thematic interaction with other users via their use as trading cards. Each ornamental card can also constitute a multilayered structure capable of delivering to a user more surface area of thematic items than can fit within the total surface area of the card itself.

The ornaments themselves, according to many if not most embodiments, provide the advantage of being usable in both wet and dry environments, both indoors and outdoors, without substantial harm to either the ornaments themselves, or to the substrates, articles, and/or surfaces with which they are attached. For example, they can be used just as easily in a bathtub full of water as on a child's jacket, and can rapidly transition from one to another by simply detaching them from an attachment structure (e.g., hook-and-loop fastener-equipped suction cup), wiping it dry, and attaching it to a hook-and-loop fastener-equipped attachment structure affixed to the jacket. Thus, the designed ornaments and thematic system can fit into nearly every niche and environment of a child's (or other user's) lifestyle.

The described embodiments of a thematic interactive game further allow a user to interact with character designs more as characters in a thematic virtual environment than as actual objects, yet the thematic relationship pervades and is apparent in both. For example, users can interact not only with characters embodied ornaments or other system elements that they possess, but via the interactive game embodiments, can also learn of and interact with other characters, and understand those characters' thematic relationships with those they do possess. Users can therefore construct wish lists for other character-embodying ornaments and/or other system elements that they would like to obtain, providing parents, friends, and/or others with gift ideas. Users can also share their interactive game experiences with others by inviting them to participate in an internet-based embodiment of an interactive game as a 'multi-player' game, or as a saved and replayed game sequence.

The above listed advantages constitute only a small sample of the full range of benefits provided by the invented system and its many embodiments, fulfilling either or both of unrecognized needs and long-felt but unmet needs for a more universal, thematic entertainment system.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art to be substantially equivalent thereto, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility.

Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

One or more of the design elements depicted in the figures constitute copyrighted expression, and are the exclusive property of PAKNAK, LLC, assignee of the present invention.

We claim:

1. A functional, thematic entertainment system comprising:

one or more pliant ornaments, each ornament having a first textured design-bearing surface and an opposing second relatively planar surface, each ornament further comprising:

a first hook-and-loop fastener portion including a third surface coupled in an approximately parallel-planar relationship with the ornament second surface, and a fourth surface comprising one of a hook fastener portion or a reciprocal loop fastener portion, and a first expanse of an adhesive material interposed between the ornament second surface and the fastener third surface and forming a durable adhesive bond therebetween, the first expanse of adhesive material being disposed substantially coextensive with the third surface; and a second hook-and-loop fastener portion including a fifth surface comprising the other of the hook fastener portion or the reciprocal loop fastener portion, and a sixth surface configured for coupling in a relatively parallel-planar relationship with a seventh surface, and further comprising a second expanse of an adhesive material disposed at and durably bonded with the sixth surface and wherein the ornament comprises a material which exhibits a detectable response when a condition of a human-affecting environmental influence either exceeds or falls below a threshold response level, or when the condition either enters or departs from a response-activating range of exposure.

2. The system of claim 1, further comprising:

an article having a relatively planar portion including a seventh surface, the seventh surface being adhesively coupled with and at least coextensive with the second expanse of adhesive material of the second hook-and-loop fastener to interchangeably receive and detachably retain any of a plurality of ornaments, the article having a second portion configured as a detachable coupling member for coupling the article with either or both of a suitable user-selected substrate and a user-selected structure.

3. The system of claim 2, wherein the detachable coupling structure comprises one or more selected from the group consisting of a magnetized material, a pin-like portion, a pin and clasp arrangement, a hooked portion, a flexible concave portion, an elastic gather, a ring portion, a clip portion, a structural element including one or more openings provided therethrough, and a deformable, elongated structure.

4. The system of claim 1, wherein dimensions of the one or more ornaments are found within the ranges of approximately one and three-quarters inches to two and one-half inches (1.75"-2.5") wide, one and three-quarters inches to two and one-half inches (1.75"-2.5") tall, and three-sixteenths to three-eighths inches (0.1875"-0.375") thick.

5. The system of claim 1, further comprising:

an interactive, remotely-accessible game comprising device-executable code stored at a data storage medium, and configured, when executed on an electronic device, to present at a display device a user-interactive game sequence including visual elements corresponding with the design-bearing first surface of the ornament.

6. The system of claim 1, further comprising:

an ornamental card having a first relatively planar side and an opposing second relatively planar side, wherein one or both of the first and second sides include a graphic design thematically corresponding to the design-bearing surface of the ornament, and one or both of the first and second sides of the ornamental card further include printed information relating to a fictional character embodied in the ornament.

7. The system of claim 6, wherein one or both of the first and second side of the ornamental card further comprise an expanse of an adhesive-releasing material disposed at a surface of the ornamental card, and wherein the adhesive-releasing material is configured to enable removal of an article adhered therewith via an adhesive without substantially affecting adhesive properties of the adhesive.

8. The system of claim 6, further comprising:

a plurality of material layers wherein at least one layer overlies at least a portion of an adjacent underlying layer in a relatively parallel-planar relationship, wherein the adjacent underlying layer comprises either the card or another material layer either directly or indirectly overlying a portion of the card, and wherein the overlying layer is adhesively-coupled with a release material disposed intermediate adjacent facing surfaces of the overlying layer and the adjacent underlying layer.

9. The system of claim 6, wherein dimensions of the ornamental card may be found within the ranges of two and one-quarter to two and three-quarters of an inch (2.25"-2⁄75") wide, and three and three-quarters to four and one-quarter inches (3.75"-4.25") tall.

10. The system of claim 1, further comprise:

a plurality of design features at the design-bearing surface, wherein each design feature comprises at least one of a plurality of colors, and wherein each design feature having a first color is separated from each other design feature having at least a second color by a textural feature integrally-formed at the first design-bearing surface therebetween.

11. The system of claim 1, further comprising:

an image-transferring means configured to transfer to a substrate an image corresponding to the design-bearing surface of the ornament, the image-transferring means comprising one or more selected from the group consisting of, an ink-transferring mechanism including an ink-acquiring and releasing portion configured with a three-dimensional image inversely corresponding to the design-bearing surface of the ornament, and further configured to transfer ink by alternating contact with an ink source and with an ink-receiving surface of an article, wherein the transferred ink forms a pattern corresponding to the design-bearing surface of the ornament, and further including a grip portion configured to be gripped by a human hand and so located relative to the ink-acquiring and releasing portion as to keep the hand relatively ink-free during ink transfer, and a peel-and-stick sticker configured as an expanse of a material having a first image-bearing side and a second adhesive-bearing side, wherein the first image-bearing side includes an image corresponding to the design-bearing surface of the ornament, and the second adhesive-bearing side includes an expanse of an adhesive material.

12. The system of claim 1, further comprising:

a display arrangement configured with one or more second hook-and-loop fastener portions coupled with one or more surfaces retained in a protective enclosure, the one or more second hook-and-loop fastener portions sufficiently separated spatially one from another to enable relatively unobstructed coupling of one or more ornaments at the surface.

13. The system of claim 1, further comprising:

a greeting card having one or more retaining portions configured to securely and detachably retain either an ornament alone, or an ornament and one or both of an ornamental card and an image-transferring means, wherein the one or more retaining portions are selected from among the group consisting of, the second hook-and-loop fastener portion detachably coupled with a release material disposed at a surface of the greeting card, one or more openings formed in a portion of the greeting card, the openings configured to engage and retain a portion of either an ornament or an ornamental card inserted therethrough, a recess formed into a surface of the greeting card and including a periphery and a depth configured to receive an ornament placed therein, and the peel-and-stick sticker detachably coupled with a release material disposed at a surface of the greeting card.

14. The system of claim 1, further comprising:

a remotely-accessible coloring book comprising device-executable code retained at a data storage medium and configured when executed to render one or more downloadable images viewable at a display device, wherein at least a portion each image corresponds with the design-bearing surface of the one or more ornaments.

15. The system of claim 1, further comprising:

a removable liner comprising an expanse of a flexible sheet-like material detachably adhered with the second expanse of adhesive material in a parallel-planar arrangement, the liner having a first side and an opposing second side, and further comprising a release material disposed at least coextensively with the second expanse of adhesive material at one or both of the first liner side and the second liner side.

16. The system of claim 1, further comprising:

a plurality of thematic categories within which one or more designs of the one or more design-bearing ornaments are included, one or more of the thematic categories being indicated by indicia presented at one or more of an ornamental card, a user-perceivable portion of an interactive thematic game, a thematic website, a portion of an ornament, and a thematic greeting card.

17. The system of claim 1, wherein the ornament further comprises:

either or both of a light-reflecting portion and a light-emitting portion.

18. An interchangeable entertainment system of attachable and detachable ornaments, comprising:

one or more non-water-absorbent, textured-design-bearing, hook-and-loop fastener-backed ornaments;

one or more ornamental trading cards, each ornamental trading card including at least one graphic image corresponding to a design of the one or more design-bearing ornaments and further including text identifying at least one fictional attribute assigned to a character embodied in the design;

at least one reciprocal hook-and-loop fastener including one or the other of hook elements and loop elements configured to detachably engage the complimentary other hook elements or loop elements of the hook-and-loop fastener-backed ornament; and device-executable code configured, when executed on a computing device, to produce at a display device a user-viewable interactive game sequence including one or more images corresponding to one or more designs of the design-bearing ornaments, the code also providing to a user one or more capabilities to affect one or more images presented at the display by the game sequence.

* * * * *

UNITED STATES PATENT AND TRADEMARK OFFICE

CERTIFICATE OF CORRECTION

PATENT NO. : 8,052,534 B2
APPLICATION NO. : 12/082372
DATED : November 8, 2011
INVENTOR(S) : Marissa Beth Crouch et al.

It is certified that error appears in the above-identified patent and that said Letters Patent is hereby corrected as shown below:

Column 28, line 39, cancel the text beginning with "9. The system of claim 6" and ending with "four and one-quarter inches (3.75"-4.25") tall." in column 28, line 43, and insert the following claim:

--9. The system of claim 6, wherein dimensions of the ornamental card may be found within the ranges of two and one-quarter to two and three-quarters of an inch (2.25"-2.75") wide, and three and three-quarters to four and one-quarter inches (3.75"-4.25") tall.--

Signed and Sealed this
Thirty-first Day of January, 2012

David J. Kappos
*Director of the United States Patent and Trademark Office*